(12) United States Patent
McLennan et al.

(10) Patent No.: US 7,613,335 B2
(45) Date of Patent: Nov. 3, 2009

(54) METHODS AND DEVICES USEFUL FOR ANALYZING COLOR MEDICAL IMAGES

(75) Inventors: Geoffrey McLennan, Iowa City, IA (US); Martin Donnelley, Blackwood (AU); Deepa Gopalakrishnan, San Diego, CA (US); Eric Hoffman, Iowa City, IA (US); Joseph Reinhardt, Iowa City, IA (US); Melissa Suter, Iowa City, IA (US)

(73) Assignee: The University of Iowa Research Foundation, Iowa City, IA (US)

( * ) Notice: Subject to any disclaimer, the term of this patent is extended or adjusted under 35 U.S.C. 154(b) by 773 days.

(21) Appl. No.: 10/777,764

(22) Filed: Feb. 12, 2004

(65) Prior Publication Data

US 2005/0036668 A1   Feb. 17, 2005

Related U.S. Application Data

(60) Provisional application No. 60/447,639, filed on Feb. 12, 2003.

(51) Int. Cl.
*G06K 9/00* (2006.01)
(52) U.S. Cl. ............... 382/128; 382/162; 382/167; 382/131; 382/132
(58) Field of Classification Search ............ 382/128, 382/131, 132, 218, 162, 167, 274; 345/603, 345/600; 358/504, 518; 378/28
See application file for complete search history.

(56) References Cited

U.S. PATENT DOCUMENTS

| | | | |
|---|---|---|---|
| 5,345,315 A | 9/1994 | Shalit | 358/406 |
| 5,374,965 A | 12/1994 | Kanno | 348/705 |
| 5,398,684 A | 3/1995 | Hardy | 128/653.1 |
| 5,712,966 A | 1/1998 | Nadachi | 395/128 |
| 5,827,190 A | 10/1998 | Palcic et al. | 600/476 |
| 5,836,877 A | 11/1998 | Zavislan | 600/407 |
| 6,039,047 A * | 3/2000 | Rock et al. | 128/897 |
| 6,081,612 A | 6/2000 | Gutkowicz-Krusin et al. | 382/128 |
| 6,415,048 B1 | 7/2002 | Schneider | 382/131 |
| 6,501,849 B1 | 12/2002 | Gupta et al. | 382/141 |
| 6,504,895 B1 | 1/2003 | Dixon et al. | 378/19 |
| 6,507,632 B1 | 1/2003 | Hsieh | 378/4 |
| 6,508,768 B1 | 1/2003 | Hall et al. | 600/443 |
| 6,516,277 B2 | 2/2003 | Edgecombe et al. | 702/27 |

(Continued)

OTHER PUBLICATIONS

Chang and Reid, "RGB calibration for color image analysis in machine vision," *IEEE Trans. On Image Processing*, 5(10):1414,1422, 1996.

(Continued)

*Primary Examiner*—Anh Hong Do
(74) *Attorney, Agent, or Firm*—Fulbright & Jaworski L.L.P.

(57) ABSTRACT

In one embodiment, a method that includes comparing a subject color medical image to normal color medical image data; and identifying abnormal pixels from the subject color medical image. Another embodiment includes a computer readable medium comprising machine readable instructions for implementing one or more steps of that method. Another embodiment includes a device that has a field programmable gate array configured to perform one or more of the steps of that method. Another embodiment includes a device that has an application specific integrated circuit configured to perform one or more of the steps of that method.

5 Claims, 34 Drawing Sheets
(8 of 34 Drawing Sheet(s) Filed in Color)

U.S. PATENT DOCUMENTS

| | | | |
|---|---|---|---|
| 6,519,355 B2 | 2/2003 | Nelson | 382/133 |
| 6,819,790 B2 * | 11/2004 | Suzuki et al. | 382/156 |
| 6,873,438 B2 * | 3/2005 | Fotland | 358/1.9 |
| 7,035,454 B2 * | 4/2006 | Kumada et al. | 382/162 |
| 7,260,249 B2 * | 8/2007 | Smith | 382/128 |

OTHER PUBLICATIONS

Gopalakrishnan et al.,"Color analysis of the human airway wall," Proceedings of the SPIE 4683:341-351, 2002. (Provided in color).

Gopalakrishnan, "Color analysis of the human airway wall," thesis presented less than one year prior to Feb. 12, 2004. (Provided in color).

Gopalakrishnan, "Color analysis of the human airway wall," Nov. 6, 2002. (Provided in color).

Herbin et al., "Assessment of healing kinetics through true color imaging processing," *IEEE Trans. Medical Imaging*, 12(1):39-43, 1993.

Herbin et al., "Color quantitation through image processing in dermatology," *IEEE Trans. On Medical Imaging*, 9(3):262-269, 1990.

Nischik and Forster, "Analysis of skin erythema using true-color images," *IEEE Trans. Medical Imaging*, 16(6):711-716, 1997.

Suter et al., "Evaluation of the human airway with multi-detector x-ray-computed tomography and optical imaging," *Physiological Measurement*, 25:1-11, 2004. (Provided in color).

Suter et al., "Pulmonary disease detection based on airway mucosal color," In: *Amer. J. Respiratory and Critical Care Medicine*, 167:A584, 2003. (Provided in color).

Suter et al., "Three-dimensional true color topographical analysis of the pulmonary airways," Proceedings of the SPIE, 5369: 189-198, 2004. (Provided in color).

Vander Haeghen et al., "An imaging system with calibrated color acquisition for the use in dermatology," *IEEE Trans. Medical Imaging*, 19(7):722-730, 2000.

* cited by examiner

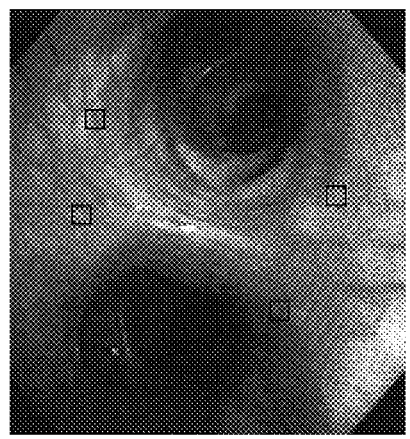 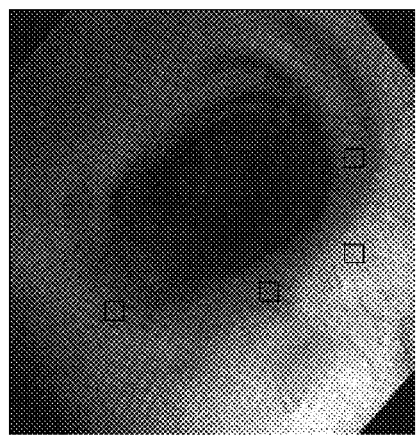
FIG. 17C  FIG. 17D
FIG. 18

METHODS AND DEVICES USEFUL FOR ANALYZING COLOR MEDICAL IMAGES

CROSS-REFERENCE(S) TO RELATED APPLICATION(S)

This application claims priority to U.S. Provisional Patent Application Ser. No. 60/447,639, filed Feb. 12, 2003, the entire contents of which (including the appendices) are expressly incorporated by reference.

STATEMENT REGARDING FEDERALLY SPONSORED RESEARCH

This invention was made with government support under grant number CA094310-02 awarded by the National Institutes of Health. The government has certain rights in the invention.

BACKGROUND OF THE INVENTION

1. Field of the Invention

The invention relates generally to the field of medical imaging. More particularly, the invention relates to the analysis of color medical images to detect abnormalities in the subject tissue.

2. Discussion of the Related Art

Despite the dramatic progress of multimedia information technology and its rapid spread into the medical profession, discussions on medical images so far have concentrated largely on sufficient spatial sampling rate and sufficient gray-scale gradations for black and white pictures such as X-ray, CT and MRI. The problems concerning the transmission of medical color images such as endoscopic and dermatological images have not, however, been discussed intensively.

Color image analysis has been extensively used in dermatology and in the assessment of wound healing (Herbin et al., Haeghen et al.). Nischik et al. in 1997 developed a method to analyze the spreading of skin erythemas by determining the change in the color of the skin from true color images in the CIE L*a*b* color space. Also, Herbin et al. in 1990 determined a quantitative analysis for the follow up of skin lesions. Considering that each imaging system has its own time-varying RGB color space that depends on its own unique spectral sensitivities, it remains difficult to accurately describe colors in device-dependent RGB. Therefore, it has been found that the use of a device-dependent red-green-blue (RGB) color spaces is a problem.

A color calibration method for correcting for the variations in RGB color values caused by the imaging system components was developed and tested by Chang et al. in 1996. They tried to reduce the variations caused by additive and multiplicative errors in the RGB color values. Herbin et al. tried to determine the best color space for use in the field of dermatology. Haeghen et al. extensively discussed a method to convert the device-dependent RGB color space into a device-independent color space called sRGB. Others have addressed the problem of finding a transform between the device-dependent color space to a device-independent color space (Herbin et al., Haeghen et al., Chang et al., Kang et al.).

Knyrim et al. have demonstrated that the Olympus video endoscopes reproduces hue very well but desaturates the color. A color calibration method may correct for this desaturation problem.

The International Commission on Illumination (CIE) is a standards body in the field of color science. They have defined additional color spaces, such as CIE XYZ and CIE L*a*b*, which describe color based on differences perceived in the human visual system (Giorgianni et al.). As described in Herbin et al., Haeghen et al., and Nischik et al., the CIE L*a*b* system has been found to be the best color space in which to make measurements. The device-independent color space sRGB has a known relationship with CIE XYZ and CIE L*a*b* color spaces (Giorgianni et al.). In the CIE L*a*b* space, colors can be compared by computing a distance metric $\Delta E$ that is proportional to the color deviation as seen by a human observer.

Other color spaces are also suitable for color comparisons; in the assessment of wound healing kinetics, the hue-saturation-value (HSV) color space was found to be a good representation for the color index (Herbin, Fox et al.). The sRGB device-independent color space also has a known relationship with HSV color space and the HSV space may be easier for humans to understand and interpret than CIE L*a*b* (Giorgianni et al.).

SUMMARY OF THE INVENTION

In one embodiment, the invention is a method that comprises comparing a subject color medical image to normal color medical image data; and identifying abnormal pixels from the subject color medical image.

The normal color medical image data may be collected from patients with normal tissue and stored in a databases or databases that are accessed at some time during the comparison. The subject color medical image may be taken by a medical device such as an endoscope (e.g., a bronchoscope), and may be the only image taken by the medical device (e.g., a still image) or it may be one of many images (e.g., a sequence of images) that are taken by the medical device.

The comparing may involve acquiring a medical image that is in red-green-blue (RGB) format and converting that medical image to one that is in hue, saturation and intensity (HSI) format. The medical image may contain one or more regions of interest (ROI). Each ROI includes one or more pixels, and each pixel may have an RGB value. The conversion may involve mapping the location of one or more of the pixels on a color wheel, which may effectively show the hue and saturation of the pixels. The hue and saturation of the pixels may not actually be calculated. Instead, vector arithmetic may be used to convert an RGB value of a pixel into a color wheel location. The comparing may also involve examining the normal color medical image data that may be stored in a database, and determining whether the color wheel location of the pixel in question is normal or abnormal. The normal color medical image data against which the color wheel location of the pixel in question is compared may contain all the normal color wheel locations for a given tissue.

The identifying may involve displaying a color wheel and noting the color wheel locations of pixels that are normal with one color (e.g., gray) and noting color wheel locations of pixels that are not normal with another color or colors (e.g., black). The color wheel may be displayed on a graphical user interface (e.g., a monitor) that is part of computer system. The identifying may alternatively or in addition involve displaying the subject color medical image on the same or a different graphical user interface as the color wheel, and noting the abnormal pixel or pixels on the subject color medical image by, for example, highlighting the abnormal pixel or pixels by, for example, using a different color.

Other embodiments having additional and/or different features are discussed below.

Another embodiment of the invention is a computer readable medium comprising machine readable instructions for implementing one or more of the steps of any of the methods described above.

In still another embodiment, the invention is a device that includes either a field programmable gate array (FPGA) or an application specific integrated circuit (ASIC) that is configured to perform at least one or more of the steps of any of the methods described above. That is, the FPGA or the ASIC can be provided with logic, or programming, that can be utilized in performing one or more of the steps of any of the methods described above.

BRIEF DESCRIPTION OF THE DRAWINGS

The following drawings illustrate by way of example and not limitation. The patent or application file contains at least one drawing executed in color. Copies of this patent or patent application publication with color drawings will be provided by the Office upon request and payment of the necessary fee.

FIGS. 17A-17D show examples of the different regions from bronchoscopic images of normal subjects with sample regions used for the analysis marked on them. The different regions shown here are 17A trachea, 17B main carina, 17C left main bronchus, and 17D right main bronchus.

FIG. 18 shows an example bronchoscopic image from a cystic fibrosis subject showing sample regions used for the analysis.

DESCRIPTION OF ILLUSTRATIVE EMBODIMENTS

Figure 1A:
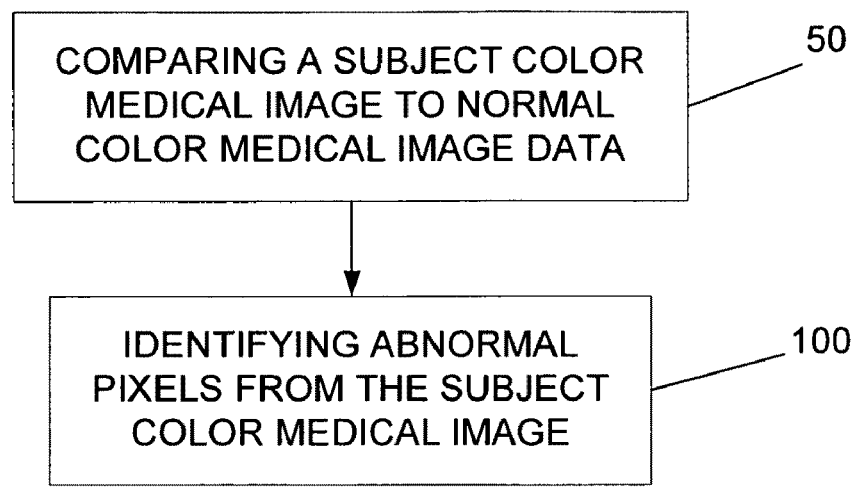
FIGS. 1A-1G illustrate steps of embodiments of the present methods.

The terms "comprise" (and any form of comprise, such as "comprises" and "comprising"), "have" (and any form of have, such as "has" and "having"), and "include" (and any form of include, such as "includes" and "including") are open-ended linking verbs. As a result, a method or a device (e.g., a computer readable medium or a computer chip) that "comprises," "has," or "includes" one or more steps or elements possesses those one or more steps or elements, but is not limited to possessing only those one or more elements or steps. Thus, a method "comprising" comparing a subject color medical image to normal color medical image data (see step 50 in FIGS. 1A, 1B and 1C); and identifying abnormal pixels from the subject color medical image (see step 100 in FIGS. 1A, 1B and 1C) is a method that includes these two steps, but is not limited to possessing only the two recited steps. For example, the method also covers methods with the recited two steps and additional steps such as displaying a histogram that includes (i) saturation information about the subject color medical image and (ii) saturation information about the normal color medical image data, and/or displaying the subject color medical image and highlighting areas of the subject color medical image that have a saturation that is greater than normal (see step 120 in FIG. 1C).

Similarly, a computer readable medium "comprising" machine readable instructions for implementing one or more of the steps of the method described above is a computer readable medium that has machine readable instructions for implementing at least one of the two recited steps of the method, but also covers media having machine readable instructions for implementing all of the steps and/or additional, unrecited steps. Likewise, a device "comprising" an application specific integrated circuit (ASIC) configured to perform one or more of the two recited steps of the method above is a device that possesses such an ASIC, but is not limited to possessing only such an ASIC, nor is the referenced ASIC limited to one that performs only the one or more steps.

The terms "a" and "an" are defined as one or more than one. The term "another" is defined as at least a second or more. The term "approximately" is defined as at least close to (and can include) a given value or state (preferably within 10% of, more preferably within 1% of, and most preferably within 0.1% of).

The Present Methods and Devices

Descriptions of well known processing techniques, components and equipment are omitted so as not to unnecessarily obscure the present methods and devices in unnecessary detail. It should be understood that the detailed description illustrates exemplary aspects of the present methods and devices, and not limiting examples. Various substitutions, modifications, additions and/or rearrangements within the scope of the present methods and devices will become apparent to those skilled in the art from this disclosure.

The invention provides methods and devices for analyzing and displaying a color medical image or images (see step 30 in FIGS. 1D and 1E) in a way that allows the surgeon or operator to evaluate objective, quantitative aspects of the color medical image to aid him or her in the diagnosis and/or treatment of the tissue under analysis.

Many different medical devices or imaging systems may be used or adapted for use consistent with the present methods and devices. Endoscopes are an example of such medical devices. Endoscopy is a medical procedure for viewing the interior of the body through hollow tube-like instruments. There are many different kinds of endoscopes (the instruments used for this procedure). Each type may be specially designed for examining a different part of the body. Some types of endoscopes are listed below in Table 1. In addition to the specific endoscopes listed, ultrasound endoscopes are also used, as may endoscopes have been coupled to charge coupled device (CCD) cameras.

TABLE 1

| Type of endoscope | Body Areas Examined |
|---|---|
| arthroscope | joints |
| bronchoscope | bronchus (breathing tubes of lungs) |
| cholangioscope | pancreas and the biliary tract (bile ducts) |
| colonoscope | Colon |
| colposcope | cervix and vagina |
| cystoscope | urinary, bladder |
| duodenoscope | duodenum (first part of the small intestine) |
| endoscope | small intestine |
| esophagoscope | esophagus (swallowing tube) |
| gastroscope | stomach |
| hysteroscope | inside of uterus |
| intubation endoscope | trachea, bronchi and lungs |
| laparoscope | cavity of abdomen and pelvis |
| naso-pharyngo-laryngoscopes | nasal passages, pharynx, larynx |
| nephroscope | kidneys |
| neuroscope | nervous system |
| proctosigmoidoscope | rectum and sigmoid colon (lower parts of large intestine) |
| sigmoidoscope | colon |
| thorascope | cavity of thorax (chest) |
| ureteroscope | ureter |

Depending on the area of the body being viewed, the endoscope may be inserted through a body opening like the mouth, anus, or urethra (the tube that carries urine out of the bladder). In some cases, a very small surgical incision in the abdomen or chest wall may be used to insert the endoscope.

Imaging systems other than endoscopes may also be used consistently to obtain subject color medical images consistently with embodiments of the present methods and devices. Such modalities include Computed Tomography (CT), Magnetic Resonance Imaging (MRI), X-rays, ultrasound, medical color fluorescence, and luminescence. Medical imaging generally is a specialty that uses radiation, such as gamma rays, X-rays, high-frequency sound waves, magnetic fields, neutrons, or charged particles to produce images of internal body structures. Embodiments of the present methods and devices also may be used to analyze color images (whether real or falsely-colored) associated with any wavelength, including light.

Radioscopy and related medical diagnostic imaging technologies use precision control over penetrating radiation as well as precision timing for detection and processing of resultant image data. Medical diagnostic imaging generally acquires and controls a very large amount of image data, which in turn is communicated to computer processing equipment at a very high data rate. To provide control over the generation, detection, and processing of medical diagnostic imaging, computer workstations may employ the use of a real time operating system ("RTOS") to control operation. A real time operating system, such as VXWORKS.RTM. by Wind River Systems, Inc. of Alameda, Calif., is an operating system that immediately responds to real time signaling events. On the other hand, non-real time operating systems, such as a WINDOWS.RTM. platform or a UNIX.RTM. platform, may process operations in the form of tasks until the task is complete. Both WINDOWS.RTM. and UNIX.RTM. are non-real time, multi-task operating systems in which a processor or processors are continuously interrupted to respond to multiple task based system events. Due to the high speed of commercially available processors, multi-tasking operating systems may appear to control a number of simultaneous events. [See U.S. Pat. No. 6,504,895]

Embodiments of the present methods may involve collecting color images of normal tissue and storing that data in one or more databases that can be accessed during a procedure. As a surgeon is performing a procedure, such as bronchoscopy or a colonoscopy, the tool that the surgeon uses to view the subject's tissue (e.g., an endoscope) may acquire or play a role in acquiring images of the tissue during the procedure. Using a computer system that is linked to the tool and/or part of the tool, one or more of those images may be displayed for viewing and evaluation by the surgeon and/or his or her staff. In addition, as the procedure is being performed, a certain image or images may be designated for analysis, and the colors of the pixels in that image or those images may be compared to the color of pixels from normal tissue to determine whether any portion of tissue in the image in question is abnormal.

Any abnormalities may be displayed using color on top of the display of the original image (such that the abnormal portions of the tissue are highlighted and stand out). Furthermore, abnormalities can be visually identified in other ways, such as by displaying or making available for display or evaluation (either at the time of the procedure or at a later time after the procedure is complete) quantitative details concerning the subject tissue in the image-in-question. Such details may include histograms, or plots, of (i) saturation information about the subject color medical image and (ii) saturation information about the normal color medical image data. Such details may alternatively or in addition include a maximum saturation for the subject color medical image, a mean saturation for the subject color medical image, a mean hue for the subject color medical image, a mode saturation for the subject color medical image, a mode hue for the subject color medical image, a standard deviation saturation for the subject color medical image, and a standard deviation hue for the subject color medical image.

Figure 1B:
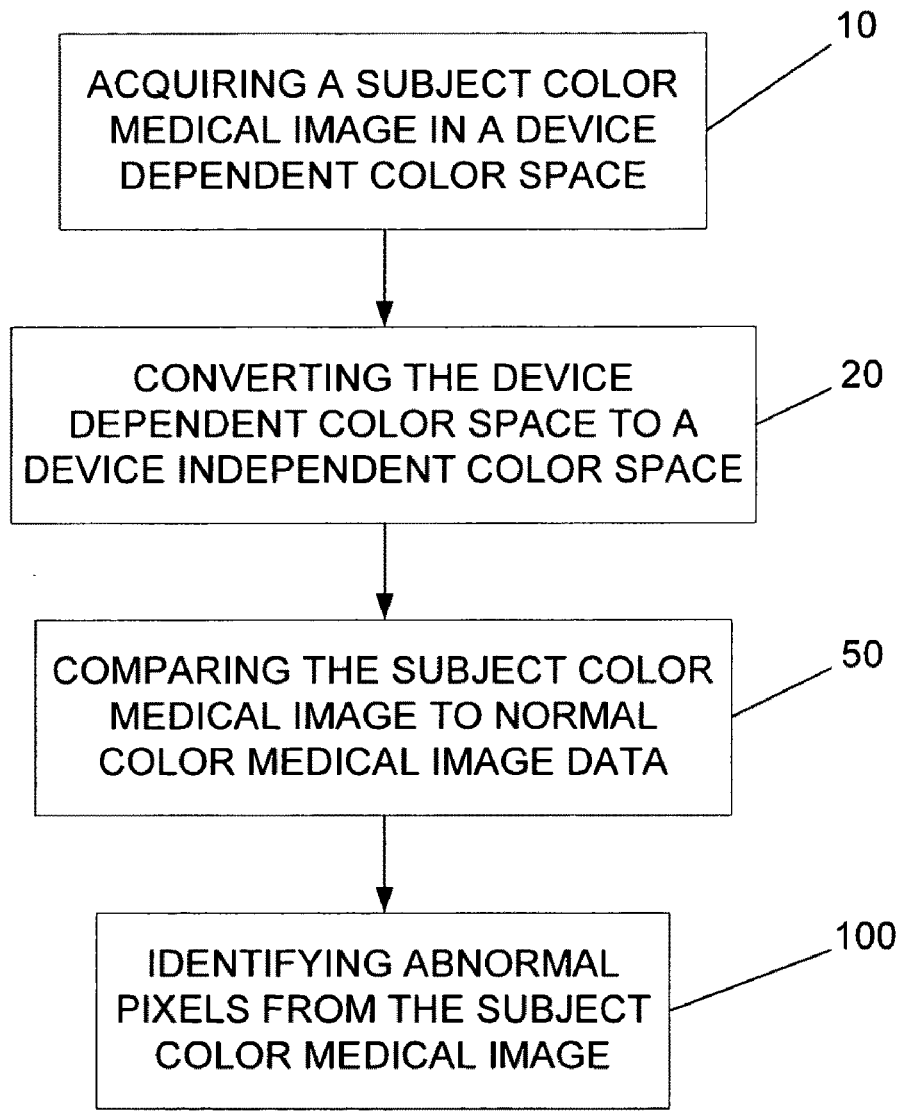
Figure 1C:
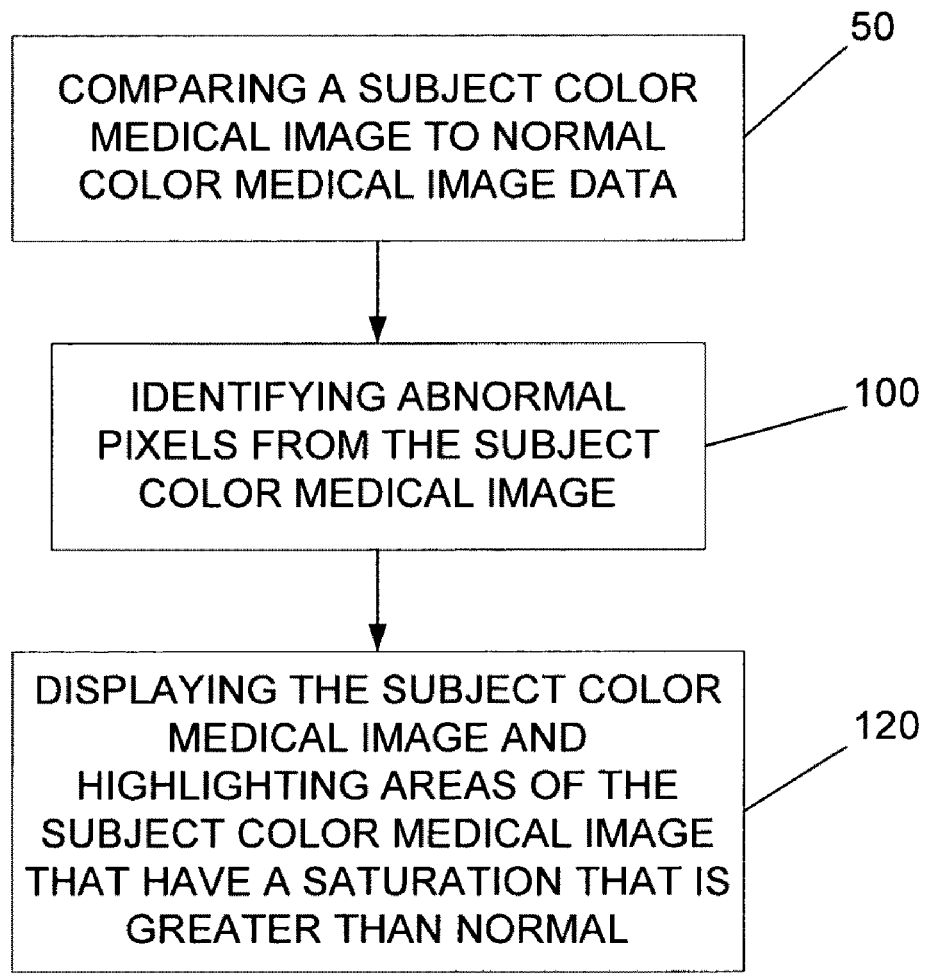
Figure 1D:
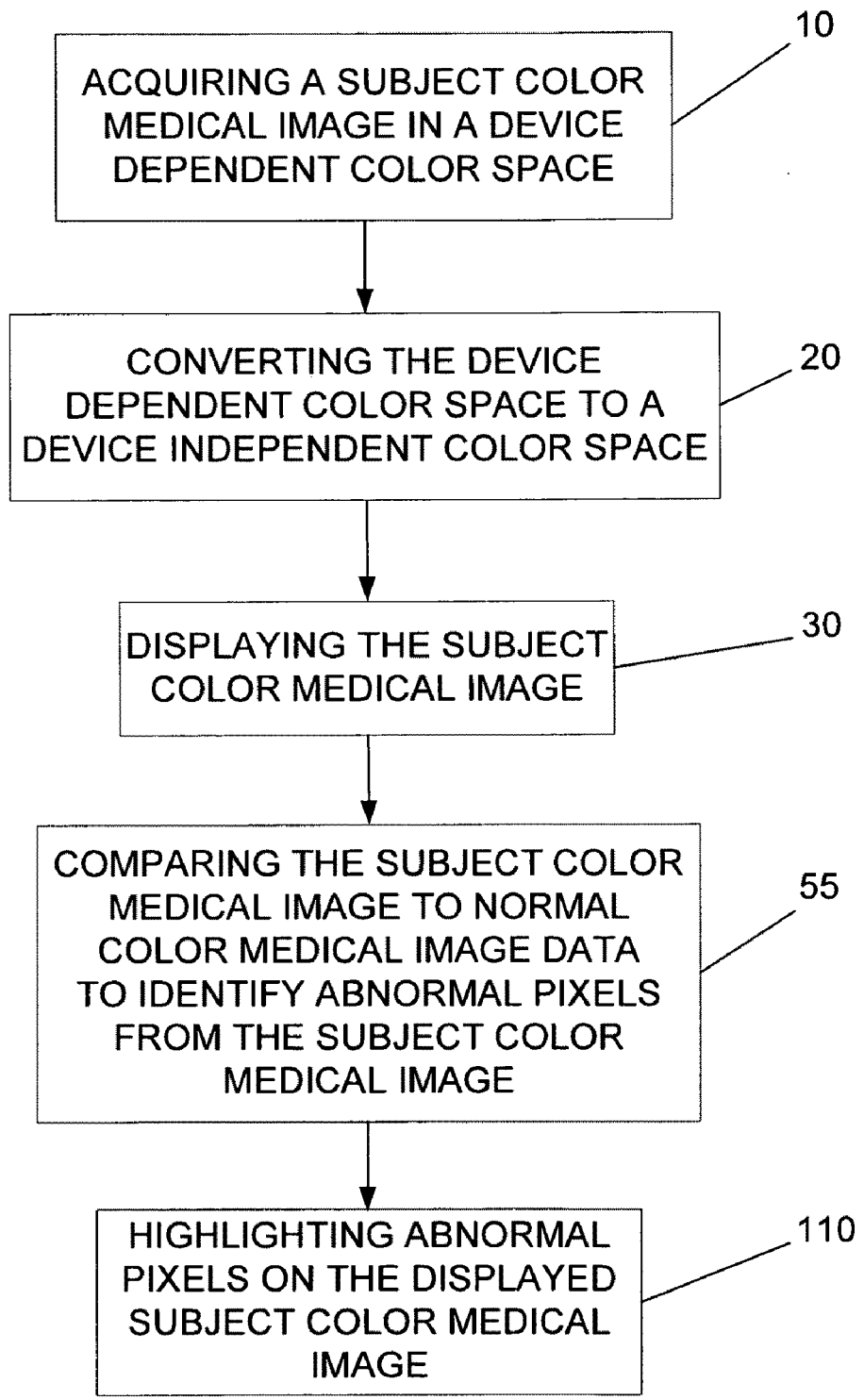
Figure 1E:
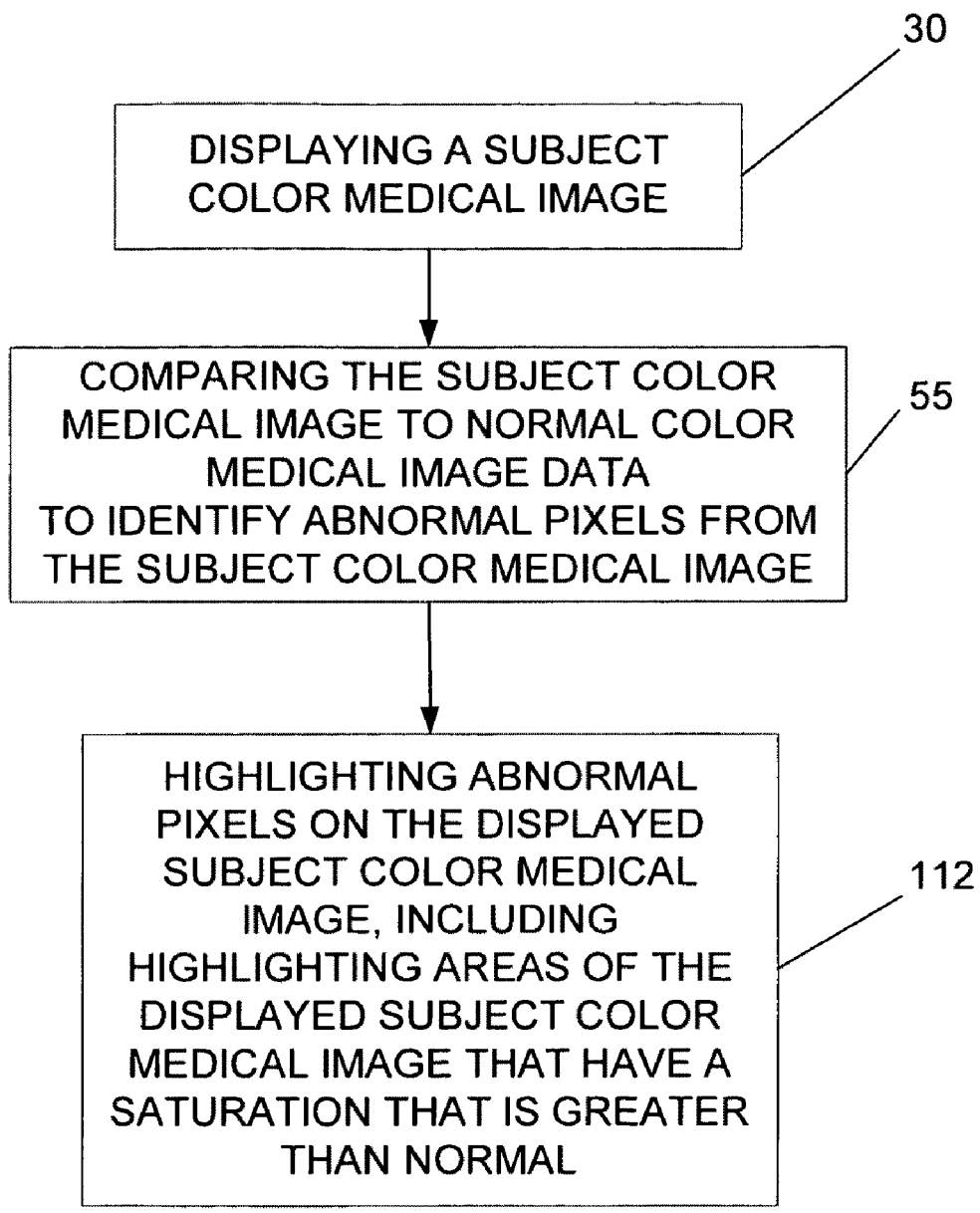
Figure 1F:
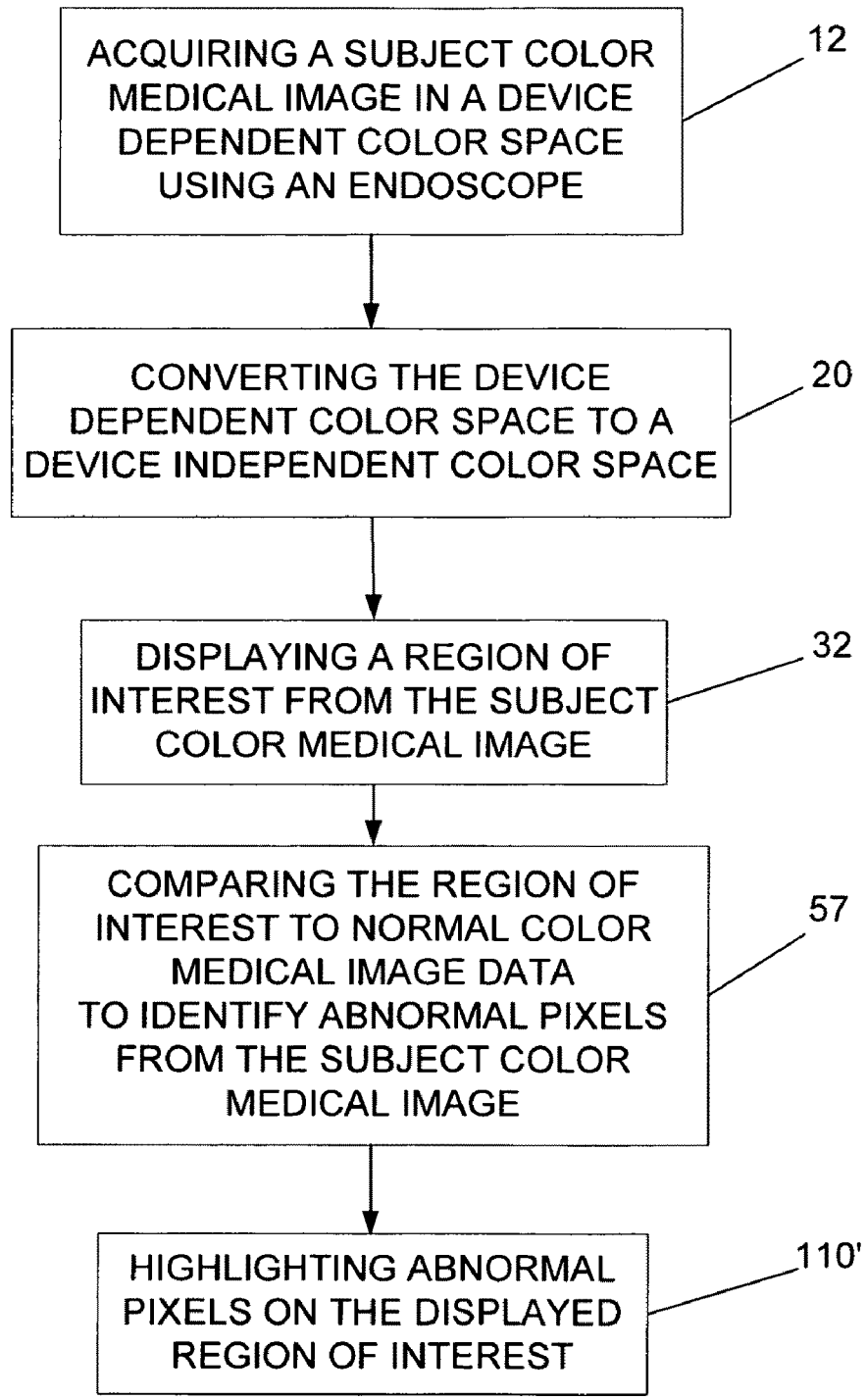
Figure 1G:
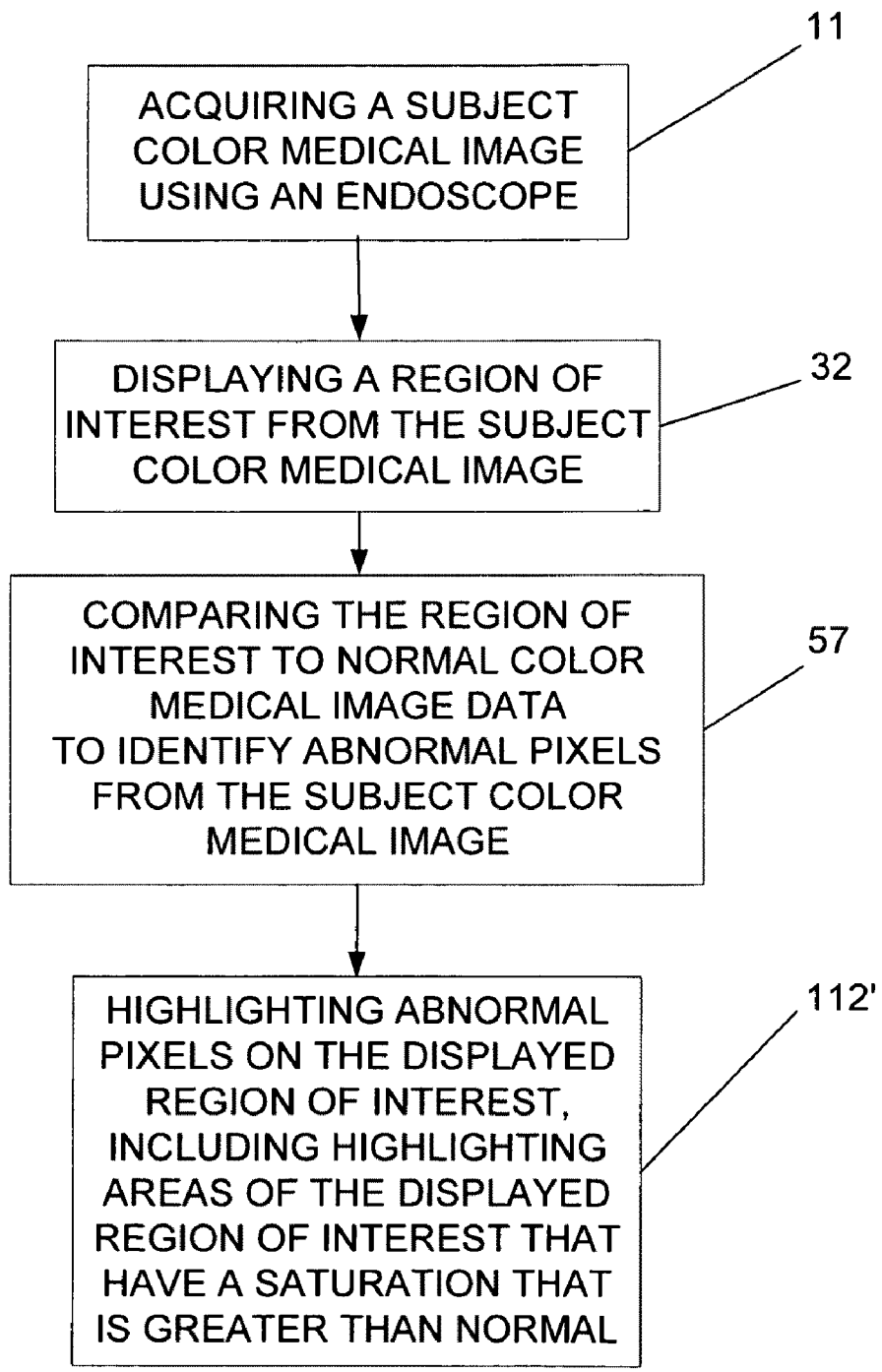

The subject color medical image used in certain of the present methods may be an image that is captured initially in gray scale with a camera (such as a CCD camera) that is part of a medical device such as an endoscope (e.g., a bronchoscope; see step 11 in FIG. 1G). The endoscope may be attached to a cart containing a monitor, a light source, and the electronics that can be used to process and display the acquired images. The light source may be a precision light source that creates white light using a xenon lamp. A rapidly rotating color wheel may be placed between the light source and the endoscope. The wheel may contain red, green, and blue filters spaced at 120 degrees from each other. Although the light emitted from the distal end of the endoscope will be repeatedly flashing red, green and blue, that light will appear white because mixing these three colors creates white light. The electronics may be configured to convert the gray scale (commonly called "black and white") image or images obtained from the CCD camera into a color image or images for display, using the process of "false coloring."

One way to achieve "false-coloring" is to assign each pixel in the black and white image a color, based on the levels of gray detected during illumination by the red, green and blue lights. The color assigned can be measured as the amount (intensity) of red, green and blue mixed together (thus creating an RGB image), with each measured on a scale from 0 to 255. Each pixel displayed on the monitor has an RGB value assigned to it. During the image acquisition process, a single rotation of the color wheel may produce one color image by combining the three images obtained during red, green and blue illumination. While this produces a color image on the screen, it is not an accurate representation of the actual colors present within the airway.

As an alternative, a "true color" endoscope (such as the Olympus XBF1T140Y3 bronchoscope, commercially available from Olympus America Inc., Melville, N.Y. as a 160 series bronchoscope) may be used to acquire the subject color medical image. Such a bronchoscope has a three-color CCD chip at its distal end. This true color bronchoscope from Olympus uses a xenon lamp for illumination with automatic gain control (AGC). This advancement will help in determining the true color of, for example, the human airway, thus better enabling a determination of subtle changes in, for example, the airway mucosa, which may indicate early cancer. The three-color chip of this bronchoscope will produce "true color" images without requiring a spinning color wheel or any form of "false coloring."

In one embodiment (FIG. 1A), the invention is a method that involves comparing a subject color medical image to normal color medical image data (step 50; see also FIGS. 1B and 1C); and identifying abnormal pixels from the subject color medical image (step 100; see also FIGS. 1B and 1C). The acquisition of subject color medical images and normal color medical image data consistent with the present methods may involve acquiring medical images in a color space that is device-dependent (see step 10 in FIGS. 1B and 1D) and, as a result, difficult to understand and interpret by humans. Another problem associated with acquiring images of the same structure under, for example, the same conditions with different imaging systems in device dependent color space is that the images that are acquired may be different and difficult to compare. As a result, it may be useful to convert the device dependent color spaces in which the subject color medical images may initially be taken into a device independent color space (see step 20 in FIGS. 1B, 1D, and 1F). The following section describes color spaces generally, and gives examples of device-dependent and device-independent color spaces, as well as examples of how to convert between the two.

1. Color Spaces

Different color imaging devices use different color spaces, such as red-green-blue (RGB) color space in television, computer monitors, etc., and cyan-magenta-yellow (cmy) color space for printers (Kang, 1997). The colors that are produced by these devices are device specific. That is, they depend on the various characteristics of the device such as the device settings, the spectral sensitivities of the color sensors of the device and the light source, etc. In addition to the device dependent color space, CIE developed a series of color spaces using colorimetry to give quantitative measures for all colors (Giorgianni and Madden, 1998). Colorimetry is a branch of color science that is concerned with measurement and specification of color stimuli, or said another way, colorimetry is the science of color measurement. These CIE descriptions are not dependent on the imaging device and are therefore known as device independent color space. Most of the device dependent color spaces were created for convenience, digital representation, and computation. They do not relate to any objective definition or the way humans see color.

1.1 Light Sources

Color begins with light. Colors that are seen are influenced by the characteristics of the light source used for illumination. For example, objects generally will look redder when viewed under a red light and greener when viewed under green light. To measure color, one may first measure the characteristics of the light source used for illumination. For this, the spectral power distribution of the source may be measured. The spectral power distribution is the power vs frequency curve of the electromagnetic radiation of the light source. This can vary greatly for different types of light sources (Giorgianni and Madden, 1998).

The most common source of light is the sun. The spectral power distribution of sunlight or daylight is greatly effected by the solar altitude and the weather conditions. CIE has therefore developed a standard illuminant that has its spectral power distribution close to daylight. This illuminant is called the D65 light source, which has its color temperature close to 6500 Kelvin. A light source that may be used with certain of the endoscopes that may be used consistently with the present methods and devices is a xenon light source that has a color temperature between 6000-6500 Kelvin, which is close to D65 illuminant (Giorgianni and Madden, 1998).

1.2 Color Stimuli

Generally, a color that is to be viewed or measured may be more correctly called a color stimulus. A color stimulus can be rightly defined as radiant energy, such as that produced by an illuminant, the reflection of light from a reflective object, or the transmission of light through a transmissive object (Giorgianni and Madden, 1998). Different color stimuli have different spectral power distributions.

1.3 Human Color Vision

Although instruments can measure color in terms of their spectral power distributions, the eye does not interpret color stimuli in a similar manner. The human color vision is dependent upon the responses of three types of photoreceptors (cones), which are in the retina of the eye. That is, the color viewed by a human eye depends on the spectral sensitivities of these cones or photoreceptors. The sensitivity of the human visual system rapidly decreases above 650 nm (nanometers). The human visual system also has very little sensitivity to wavelengths below 400 nm. The narrow range of wavelengths to which the eye is sensitive combined with the use of only three types of receptors to visualize the colors makes the human visual system non-linear. But this type of system allows the human visual system to distinguish very small differences in stimulation of the three types of photoreceptors. In fact, it has been estimated that stimulation of these photoreceptors to various levels and ratios can give rise to about ten million distinguishable color sensations (Kang, 1997; Giorgianni and Madden, 1998).

1.4 Device Dependent Color Space

1.4.1 RGB Color Space

The image data from the Olympus bronchoscope described above may be acquired in the classical red-green-blue (RGB) color space (see step 12 in FIG. 1F). The RGB color space is an additive color space represented by a unit cube (see FIG. 2A) in which each pixel is represented by weighted sum of the three main primary colors (red, green, and blue channels). The image pixels are represented using 8 bits per channel, where zero indicates no contribution of that primary color and 1 (or 255) indicates the maximum contribution of that primary color to that particular pixel. The red (R), green (G), and blue (B) components of each pixel are known as the tristimulus values. The tristimulus values of a pixel in the RGB color space may be denoted by R, G, and B for the red, green and blue channels, respectively. The RGB color system is a device dependent color space. That is, each image acquisition system will have its own unique RGB color space (Kang, 1997; Giorgianni and Madden, 1998).

1.4.2 HSV Color Space

Figure 2A:
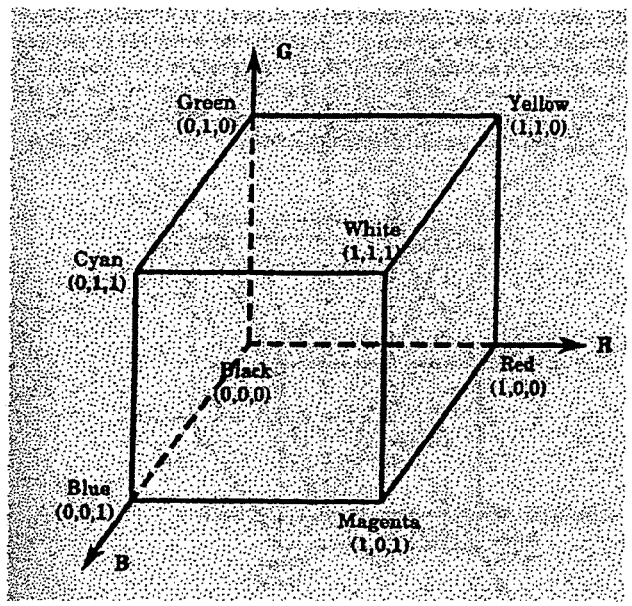
FIG. 2A depicts the red-green-blue (RGB) color space.
Figure 2B:
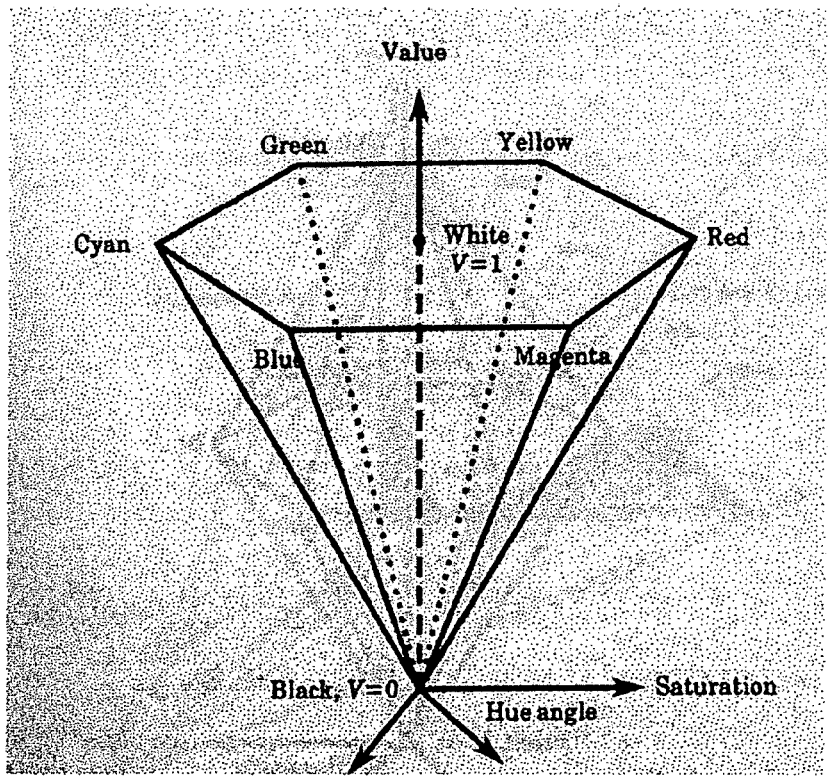
FIG. 2B depicts the hue-saturation-value (HSV) color space.

Another color space is the hue-saturation-value (HSV) color space. This color space is also normally a device dependent color space. The HSV color space has a hexcone shape as shown in FIG. 2B when compared to the RGB color space, which is a cube (FIG. 2A). In this HSV color space, the additive and the subtractive primary colors occupy the vertices of a hexagon that is the 2D (2-dimensional) projection of the RGB cube along the neutral diagonal line. The 2D projection of the RGB cube governs the hue change. Hue H is represented as an angle about the vertical axis where 0° hue is red, 120° hue is green, and 240° hue is blue. The complementary colors are 180° apart in the 2D projection of the RGB cube (Kang, 1997).

The saturation S indicates the strength of the color and varies from 0 to 1. Saturation increases while moving from the center of the hexagon to its edge. Saturation represents the ratio of the purity of the selected color (Kang, 1997).

Value V indicates the darkness of the color. Value varies from 0 at the apex of the hexcone to 1 at the top. The apex represents black. At the top, colors have their maximum intensity. For example when V=1 and S=1, one gets only pure hues. White is located at V=1 and S=0. Since HSV color space is a modification of the RGB color space, there is a simple transform that exists between them (Kang, 1997).

The relationship between the RGB color πIIII space and the HSV color space is given by the following equations (Pratt, 1978):

$$V = R+G+B, \quad (1)$$

$$S = 100-300*[\min(R, G, B)/(R+G+B)], \quad (2)$$

$$H = W \text{ if } B \leq G \quad (3)$$

$$H = 2*\Pi - W \text{ if } B > G, \quad (4)$$

$$W = \cos^{-1}((R(G+B)/2)/((R-G)^2 + (R-B)*(G-B))^{1/2}). \quad (5)$$

1.5 Device Independent Color Space

Both the RGB and HSV color spaces are device dependent color spaces. As mentioned above, the images from the Olympus bronchoscope mentioned above may be in the classical RGB color space. The images of the same structure acquired under identical conditions from two different imaging systems will be different. As a result, it is difficult to compare images from different imaging systems. Therefore it is preferred to convert the device dependent color spaces to a device independent color space (Haeghen et al., 2000; Chang and Reid, 1996; Nischik and Forster, 1997).

In 1931 the Commission Internationale de l'Eclairage (International Commission on Illumination) (CIE) adopted one set of color-matching functions to define a Standard Colorimetric Observer whose color-matching characteristics are representative of those of the human population having normal color vision. A Standard Colorimetric Observer is an ideal observer having visual response described according to a specific set of color matching functions. Color matching functions represent the tristimulus values (the amount of each of the three primary colors red, green, and blue) needed to match a defined amount of light at each spectral wavelength (Giorgianni and Madden, 1998).

1.5.1 CIE XYZ Color Space

The CIE Standard Colorimetric Observer color-matching functions are used in the calculation of the CIE tristimulus values X, Y, and Z. These values quantify the trichromatic characteristics of color stimuli. The CIE XYZ color space is a visually non-uniform color space. The measured reflectance spectrum (fraction of the incident power reflected as a function of wavelength) of an object P is weighted by the spectra of the color matching functions $\bar{x}$, $\bar{y}$, and $\bar{z}$, and the standard illuminant I, which is the CIE D65 standard illuminant. Resulting spectra are integrated across the whole visible region to give the tristimulus values (Kang, 1997):

$$X \cong k\Sigma P(\lambda)I(\lambda)\bar{x}(\lambda)\Delta\lambda, \quad (6)$$

$$Y \cong k\Sigma P(\lambda)I(\lambda)\bar{y}(\lambda)\Delta\lambda, \quad (7)$$

$$Z \cong k\Sigma P(\lambda)I(\lambda)\bar{z}(\lambda)\Delta\lambda, \quad (8)$$

$$k \cong 100/\Sigma P(\lambda)\bar{y}(\lambda)\Delta\lambda, \quad (9)$$

where $\lambda$ is the wavelength of the standard illuminant and X, Y, Z are the tristimulus values of the object. The color matching functions of the CIE Standard Colorimetric observer is defined so that X, Y, and Z are non-negative. In addition, in this system, the Y tristimulus value corresponds to a measurement of luminance. The measurement of luminance is relevant in color imaging systems because luminance is an approximate correlate of one of the principal visual perceptions—brightness (Giorgianni and Madden, 1998).

1.5.2 CIE L*a*b* Color Space

The CIE XYZ color space described above is a visually non-uniform color space, meaning that the color values in this color space are not similar to the perception of colors by a human eye. Visually uniform color spaces are derived from nonlinear transforms of the CIE XYZ color space. For example, the CIE L*a*b* color space describes color relative to a given absolute white point reference. The transformation between CIE XYZ and CIE L*a*b* is given by the following equations (Kang, 1997; Pratt, 1978):

$$L^* = 116f(Y/Y_w) - 16, \quad (10)$$

$$a^* = 500(f(X/X_w) - f(Y/Y_w)), \quad (11)$$

$$b^* = 200(f(Y/Y_w) - f(Z/Z_w)), \quad (12)$$

where, $$f(t) = \begin{cases} 7.787t + (16/116) & \text{if } t < 0.008856, \\ (t)^{1/3} & \text{if } 0.008856 \leq t \leq 1. \end{cases}$$

The individual CIE L*a*b* components are in the range $L^* \in [1,100]$, $a^* \in [-100,100]$, and $b^* \in [-100,100]$.

To compare two colors $(L_1^*, a_1^*, b_1^*)$ and $(L_2^*, a_2^*, b_2^*)$ in the CIE L*a*b* space, the Euclidean distance between these values in the three dimensional L*a*b* color space, $\Delta E_{ab}$, is computed:

$$\Delta E_{ab} = \sqrt{(L_1^* - L_2^*)^2 + (a_1^* - a_2^*)^2 + (b_1^* - b_2^*)^2}. \quad (14)$$

The $\Delta E_{ab}$ computed is more or less proportional to the color difference between two colors as perceived by a human observer (Kang, 1997).

1.5.3 Standard RGB (sRGB) Color Space

To convert the device dependent RGB color space to a device independent color space, it is first converted to standard device independent sRGB color space. A number of groups have tried to find a transformation between the device dependent color space to the standard device independent color space sRGB color space (Herbin et al., 1990; Haeghen et al., 2000; Chang and Reid, 1996, Kang, 1997). The transformation between the two color spaces can be found by, for example, either the use of a polynomial transformation or gray scale balancing (Haeghen et al., 2000; Kang, 1997). The sRGB color space typically uses a white point (illuminant) with color temperature of 6500K, also known as the D65, which is a standard value for the white point color temperature given by CIE. This sRGB color space has a known relationship to CIE XYZ tristimulus values (X, Y, Z) (Haeghen et al., 2000):

$$\begin{pmatrix} X \\ Y \\ Z \end{pmatrix} = \Theta_{sRGB \to XYZ} \begin{pmatrix} R \\ G \\ B \end{pmatrix}, \text{ where } (R, G, B) \text{ are the } sRGB \quad (15)$$

tristimulus values and $$\Theta_{sRGB \leftarrow XYZ} = 100 * \begin{pmatrix} 0.412453 & 0.357580 & 0.180432 \\ 0.212671 & 0.715160 & 0.072169 \\ 0.019334 & 0.119193 & 0.0950221 \end{pmatrix}. \quad (16)$$

The sRGB color space also has a link to HSV color space. This relationship is given in equations 1 through 5.

An example of an imaging system that may be used consistently with the present methods and devices includes the following: a "true color" bronchoscope (one type of endoscope), such as the Olympus 160 series brand mentioned above; a workstation PC with at least one Intel Pentium III processor at 600 MHz and at least 512 Mb RAM (faster computers with more RAM will perform the live analysis of images faster); a 19" display; a Matrox Meteor-II single channel analog video capture PCI card (frame-grabber) installed in the PC; and a DBHD44 to 8BNC cable (to connect the bronchoscope and frame-grabber).

Figure 3:
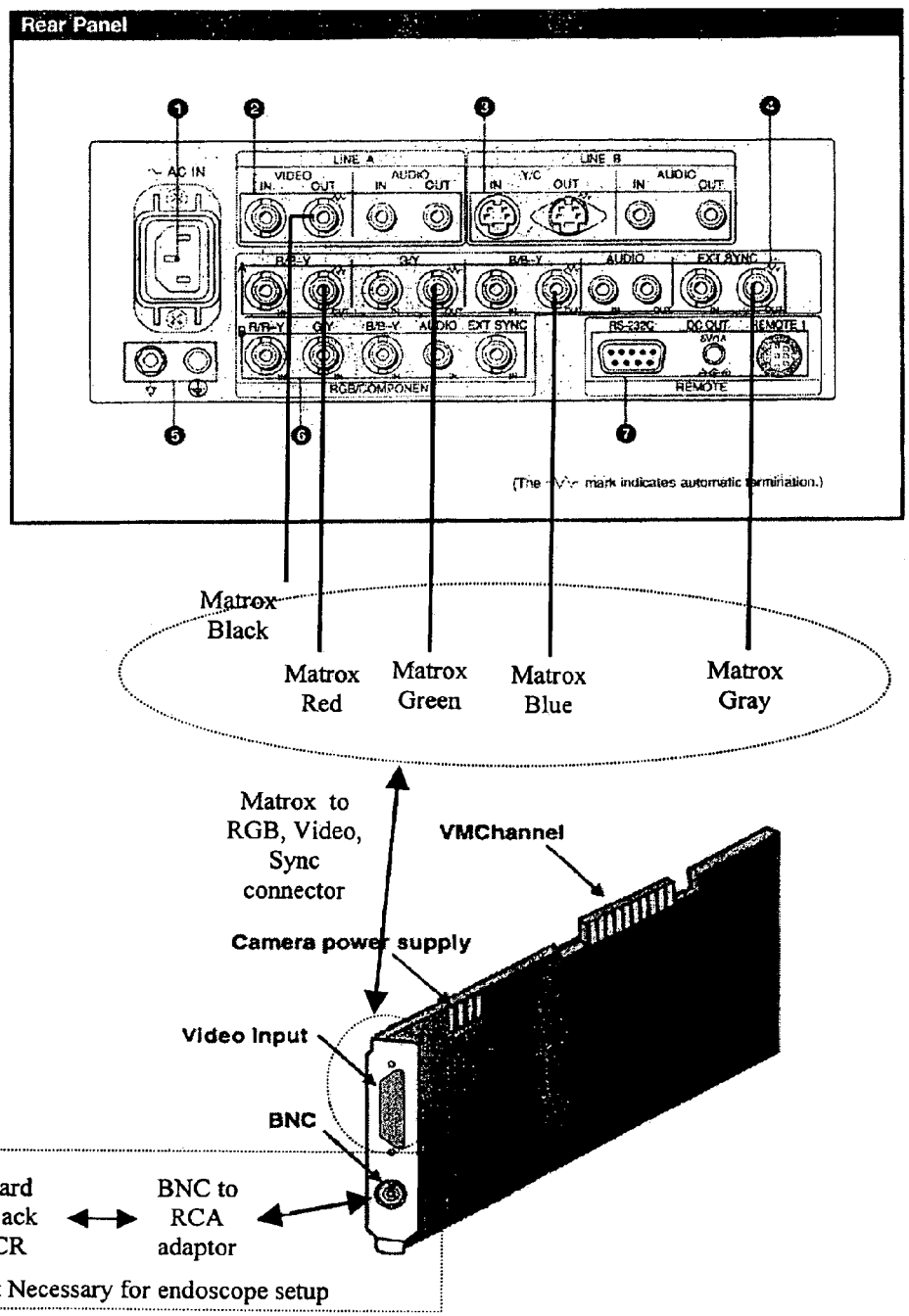
FIG. 3 depicts aspects of connections between features of one imaging system that may be used with the present method and devices.

To connect the computer to the bronchoscope, it is first necessary to ensure that both the computer and bronchoscope are turned OFF. Then connect one end of the DBHD44 to 8BNC cable to the Matrox Meteor-II card installed in the computer, and the BNC connectors to the bronchoscope monitor as shown in the diagram in FIG. 3. Once the bronchoscope is correctly connected to the computer, the application configured to performs steps of the present methods may be started.

3. Obtaining and Displaying Images

Figure 4:
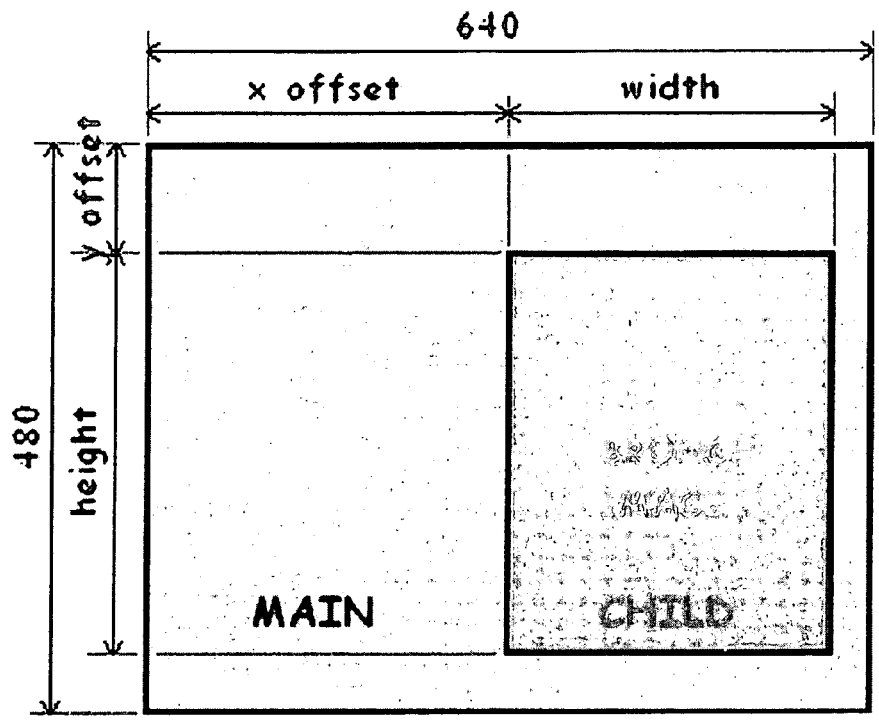
FIG. 4 depicts an example of region of interest in an image acquired by an exemplary endoscope.

One manner of acquiring a subject medical image for display using the exemplary imaging system described above follows. Those of ordinary skill in the art, have the benefit of this disclosure, will understand that a program (e.g., software) may be built to carry out the steps of the present methods. Such a program may be built using the Matrox Imaging Libraries (MIL) package, which contains functions used to communicate with and control the Matrox frame-grabber. The Matrox Meteor-II card is capable of grabbing 640×480 images at a frame rate of up to 30 frames per second. Although the frame-grabber can acquire images that are the same size as the entire bronchoscope screen, it is possible to analyze, display or save only the portion containing the actual bronchoscopic image (e.g., a portion of size 361×380). This may be achieved using a "child" buffer whose "parent" buffer is the main grab buffer. Each time an image of the entire bronchoscope screen is grabbed into the main buffer, the child buffer may be updated without any additional commands. The offset and size of the child buffer may both be chosen to ensure that it contains only the bronchoscopic image just grabbed. The contents of the "child" window may be referred to as the region of interest (ROI), or the screen ROI. FIG. 4 shows an example of such an ROI, labeled "Bronch Image" and "Child".

Once the image has been grabbed, the buffer containing the bronchoscopic image can then be manipulated to perform the color analysis. In addition to grabbing images from the bronchoscope, the program may use other MIL functions to import images that have been saved on disk. The images may be imported directly into the "child" buffer, because the buffer size and image size are the same. This follows when the program saves only the "child" ROI when images are grabbed to disk.

In either case, the images may then be displayed within a custom built, graphical user interface. The program may display images by simply copying the contents of the "child" buffer into a special display buffer, causing the image to be displayed on the screen (see step 32 in FIGS. 1F and 1G).

As mentioned above, Knyrim et al. demonstrated that the Olympus video endoscopes reproduce hue very well but desaturate the color (Knyrim et al., 1987). Color calibration can correct for this desaturation problem if it exists. The following sections describe two such techniques that may be used.

4. Color Calibration

Many different techniques may be used to determine the transformation to the device independent color space. This section describes two. In the first technique (polynomial regression), the relationship between the RGB and sRGB color space may be determined by using polynomial regression. A standard color chart with 24 known colors may be used. Because this technique involves imaging all 24 colors in the chart each time the imaging system is calibrated, it may be a time consuming process to repeat.

Figure 5:
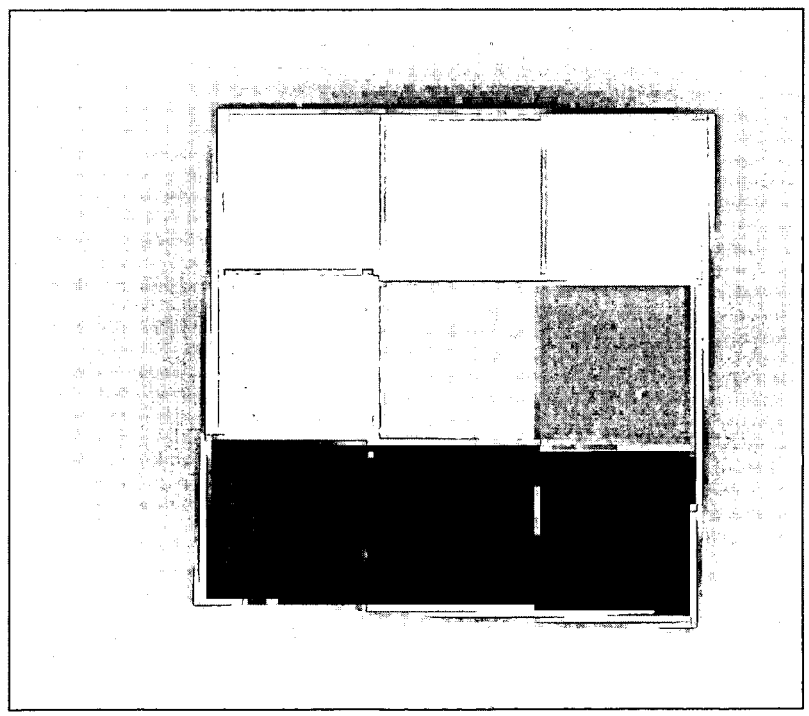
FIG. 5 depicts a gray scale target that may be used to calibrate one imaging system that may be used with the present methods and devices.

The second technique (look-up table) reduces the time required for calibration by using only nine different gray level scales. In this technique, a gray scale target (FIG. 5) may be developed with nine different gray scale values. The scale may be constructed using the Munsell Neutral Value Scale developed by Munsell Color Services, NY. Small square patches of approximately one sixth of an inch may be cut from nine different gray levels ranging from pure white to pure black. These patches may then be glued next to each other on a larger and thicker sheet of paper, with three patches in a row. This gray scale allows all the gray levels to be seen in a single field of view and can be imaged as one image, with approximately 1-1.5 cm (centimeters) distance between the gray scale target and the distal end of the bronchoscope.

As mentioned above, the light source of the exemplary bronchoscope has an automatic gain control (AGC). AGC is a process by which the bronchoscope light controls its brightness depending on the amount of light received by the CCD sensors, so that a constant illumination level is maintained. This effect will be very pronounced when all 24 color patches are imaged separately in the first technique. To minimize the effects of AGC in the second technique, the gray scale may be made in such a way that all nine gray levels could be viewed in one field of view. This gray scale may be used to develop one-dimensional look up tables to adjust the red, green and blue color channels.

The accuracy of the imaging system can be assessed by evaluating the error measure $\Delta E_{ab}$ (from equation 14), which is the measure of deviation of the color from the actual standard value. Once the relationship between the ROB and sRGB color spaces is established, the same transformation can be used for calibrating the human data.

4.1 Calibration Using Polynomial Regression

This exemplary calibration procedure estimates the transformation from the device-dependent RGB color space to the device-independent sRGB color space. The calibration procedure uses 24 standard color patches with known RGB values in D65 light (Macbeth Color Checker Chart, Macbeth, N.Y.). All the 24 colors of the chart may be imaged using the bronchoscope and acquired into the system by the frame grabber. The calibration images may be acquired in a darkened room to eliminate all other light sources other than the D65 xenon source from the bronchoscope.

After acquisition, each calibration image may be processed to determine the mean color values within the image. There are two main steps in this procedure: inverse gamma processing and thresholding. The frame grabber can apply a nonlinear transfer function, called the $\Gamma$ function, prior to digitization (Haeghen et al., 2000). However, when the pixel data is processed, it may be desirable to process the linear light pixel values, so the $\Gamma$ transfer function may be inverted.

The $\Gamma$ transfer function is given by:

$$\Gamma(p) = \begin{cases} 4.5p & \text{when } 0 \le p \le 0.018 \\ 1.099 p^{1/\gamma} - 0.0.99 & \text{when } 0.018 \le p \le 1.0, \end{cases} \quad (17)$$

for $p \in (R, G, B)$, and $\gamma$ varies from device to device, but is approximately 2.2. The transfer function in equation (17) can be easily inverted numerically to get the linear light RGB values.

The RGB image digitized by the frame grabber may be a 24-bit image with 8 bits per channel. Each channel may be divided by 255 to normalize the image. The gamma function inversion may be applied on the normalized image. The resulting image may have linear light RGB pixel values that lie between 0 and 1.

Because of the non-uniform distribution of light on the color patches and because the color patches do not always completely fill the bronchoscope field of view, the normalized images may be thresholded to identify regions of interest for color analysis. For each image, the pixels may be thresholded to identify those above 10% and below 90% of the maximum possible value. This subset of the image pixels may be used for color calibration. If the camera sensor spectral sensitivities are equal then the relationship between the RGB under D65 lighting and the sRGB color space would be linear. However, this is rarely the case due to variations in the sensors, temperature variations, etc. Therefore, the nonlinear relationship between the RGB and sRGB color space may be modeled with polynomial transforms determined by nonlinear regression (Kang, 1997). In this way, sample points in the source color space may be selected and their color specifications in the destination space may be known. A polynomial equation may be chosen to link the source and the destination color specifications. Three possible equations to link the source and the destination color specifications are contemplated, although other formulations are possible (Kang, 1997):

$$P_3(p) = a_1^p R + a_2^p G + a_3^p B, \quad (18)$$

$$P_6(p) = a_1^p R + a_2^p G + a_3^p B + a_4^p RG + a_5^p GB + a_6^p BR, \quad (19)$$

$$P_8(p) = a_0^p + a_1^p R + a_2^p G + a_3^p B + a_4^p RG + a_5^p GB + a_6^p BR + a_7^p RGB, \quad (20)$$

where $p \in (R, G, B)$, $(R, G, B)$ are the tristimulus values in the device dependent space, and the $a_i^p$ are the coefficients that are determined by non-linear regression. Note that each individual channel (red, green, and blue) is processed separately. The choice between $P_3$, $P_6$, and $P_8$ is based on the total error after calibrating the standard color patches into sRGB space. For a particular transformation P (where P is one of $P_3$, $P_6$, or $P_8$), the link from RGB space to sRGB space can be written as:

$$\begin{pmatrix} R'' \\ G'' \\ B'' \end{pmatrix} = \Theta_{RGB \to sRGB} T, \quad (21)$$

where (R", G", B") are the tristimulus values converted into the sRGB, and T is a column vector based on the original tristimulus values in RGB space, with $T = (R\ G\ B)^t$ for $P_3$, $T = (R\ G\ B\ RG\ GB\ BR)^t$ for $P_6$, and $T = (1\ R\ G\ B\ RG\ GB\ BR\ RGB)^t$ for $P_8$ and, where $A^t$ denotes matrix transpose. For a transformation $P_m$ with m=3, 6, or 8, the transformation matrix, $\Theta_{RGB \to sRGB}$ is given by:

$$\Theta_{RGB \to sRGB} = \begin{pmatrix} a_1^R & a_2^R & \cdots & a_{m-1}^R \\ a_1^G & a_2^G & \cdots & a_{m-1}^G \\ a_1^B & a_2^B & \cdots & a_{m-1}^B \end{pmatrix} \quad (22)$$

Figure 6:
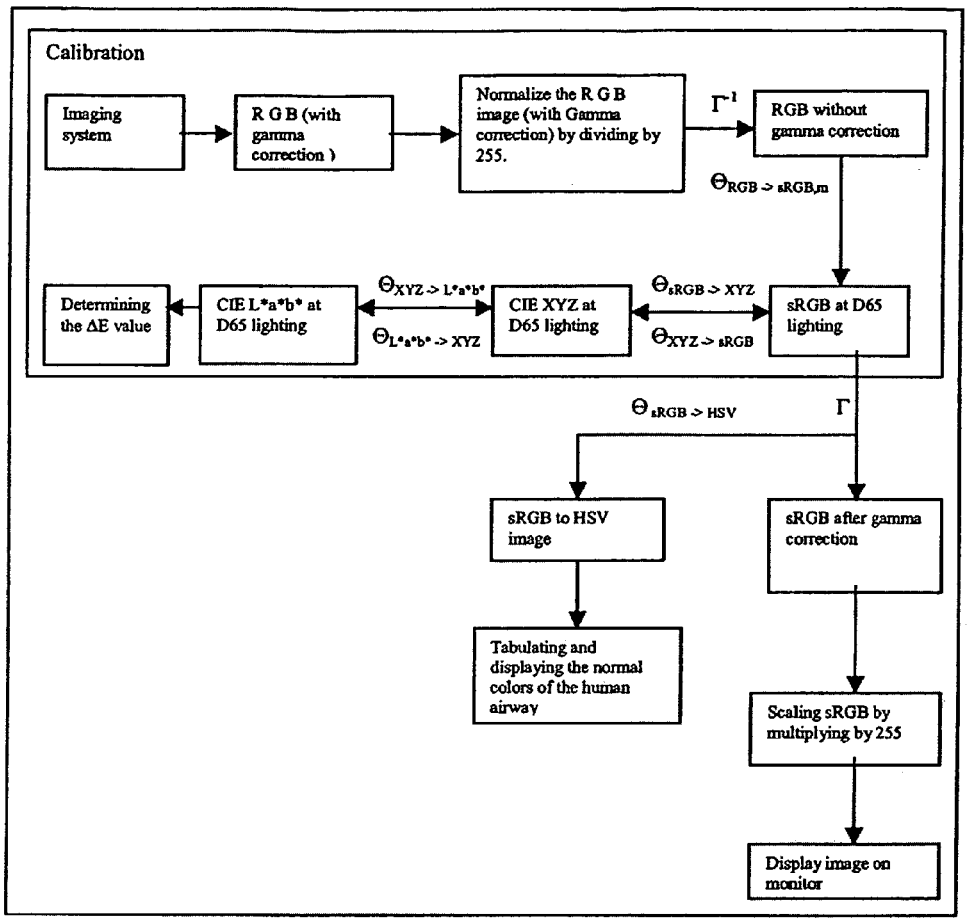
FIG. 6 is a block diagram summarizing steps involved in calibration using the polynomial regression technique.

The $\Theta_{RGB \to sRGB}$ matrix can be estimated by non-linear regression using the known sRGB values of the color patches, similar to the approach described in (Kang, 1997). Once this transformation matrix is determined, it may then be used to convert the human data to the device independent color space. The block diagram shown in FIG. 6 summarizes the various steps involved in calibration using the polynomial regression technique.

4.2 Calibration Using Look Up Table

In this second technique of calibration, the gray level target (FIG. 5) described above may be used. The nine gray levels may be imaged by the bronchoscope with approximately 1 to 1.5 cm between the gray scale target and the distal end of the bronchoscope.

Figure 7A:
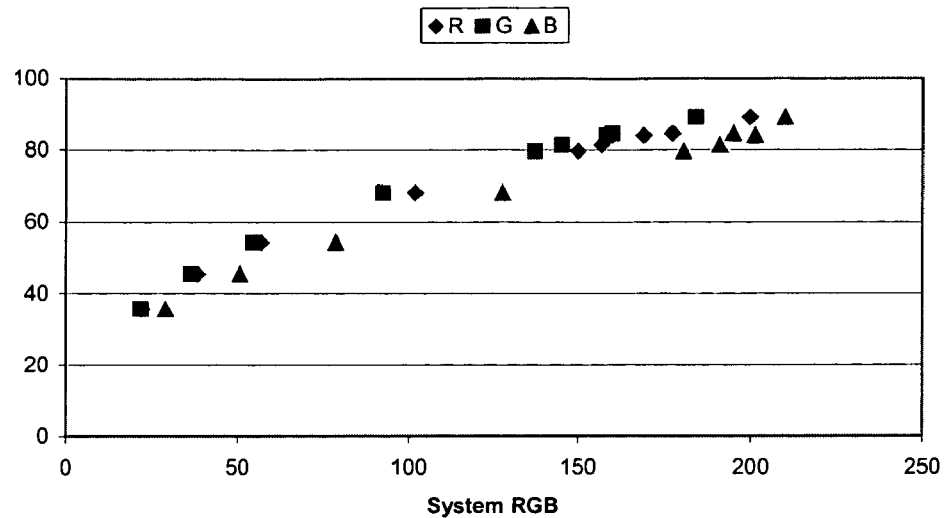
FIG. 7A is a plot showing the relationship between the RGB values of the nine gray levels from the system against their lightness value.

The R, G, and B values of the nine different gray levels may be computed. The lightness L* or luminance Y may be computed by converting the RGB color space to CIE L*a*b* color space. It is well-known that, for gray scale values, the R, G, and B values for that particular gray scale are equal. Therefore, to gray balance the system, first the R, G, and B values of the nine gray levels may be plotted against their luminance or lightness values (FIG. 7A).

This graph is preferably a single line and the slope of this line gives the gamma (Γ) value of the imaging system. But because of the characteristics of the imaging system, its property of automatic gain control and the reflectance properties of the color chart itself, this graph is generally not linear, nor do the individual curves from the red, green, and blue channels overlap to form a single line. The red, green, and blue densities of the nine gray levels may be measured using a transmission densitometer. A transmission densitometer is an instrument that measures the optical density of a color. A densitometer comprises a light source, a means for inserting a sample to be measured, a photo detector, an amplifier, and some type of analog or digital density-value indicator. Density readings are made by measuring the amount of light with and without the sample in place.

The transmission density may be determined from the transmittance factor of the sample. The transmittance factor, T, is the ratio of the amount of light transmitted, $I_t$, measured with the sample in place, to the amount of incident light, $I_i$, measured without the sample. The transmission density is given by the following relationship (Giorgianni and Madden, 1998):

$$T = \left(\frac{I_t}{I_i}\right), \quad (23)$$

$$D_t = -\log_{10}(T), \quad (24)$$

where $D_t$, is the transmission density and T is the transmittance factor. The transmittance factor is determined from the above equation once the density of the sample is known. The transmittance factor is determined for each channel separately and is then converted to a value between 0 to 255 to determine the R', G', and B' values respectively. To differentiate between the red, green, and blue values from the imaging system and the values from the densitometer, let the values from the densitometer be represented by R', G', and B'. The lightness L* value may then be calculated as described above by converting these R', G', and B' values to CIE L*a*b* values. The plot between L* and the R', G', and B' values for the nine gray levels taken from the densitometer may be drawn, and the lightness function f'(L*) may be determined for the R', G', and B' values.

The system may be gray balanced by setting (Kang, 1997):

$$R' = G' = B' = f'(L^*). \quad (25)$$

where f'(L*) is determined such that it is the best least square polynomial fit for the data. This may be determined from the three equations that describe each of the color channels for the gray levels. The intercept of f'(L*) may be determined by evaluating the average of all the three intercepts of the equations of the three different color channels, i.e., red, green, and blue. Similarly, the slope of f'(L*) may also be the average of slopes of the three channels. Therefore, by this process, the gamma Γ of the system may be adjusted. Thus, using this technique, the pixel values of the images are not converted to linear light pixel values, as may be done using the polynomial regression technique. Once the function f'(L*) is determined, it may be used to build three one-dimensional look up tables (LUT). Each LUT may be built by determining the deviation of the specific color channels R, G, and B from the function $f'(L^*)$ of the system. The next section discusses results that were obtained using the two calibration techniques just described.

4.3 Calibration and Measurement Using Polynomial Regression Method

Figure 13A:
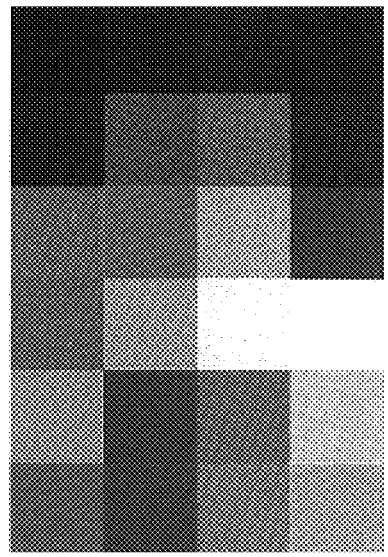
FIG. 13A shows the 24 standard colors from the Macbeth Color Chart.
Figure 13B:
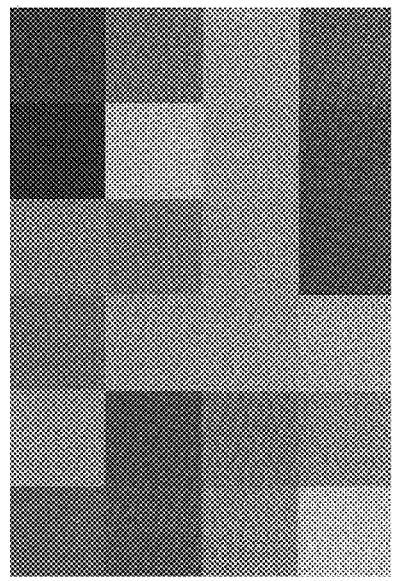
FIG. 13B shows those 24 colors before calibration as taken from an exemplary bronchoscope.
Figure 13C:
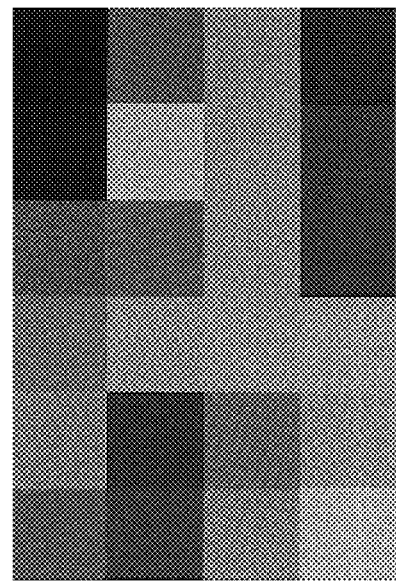
FIG. 13C shows those 24 colors after calibration using $P_{11}$.

After acquiring images of all the 24 color patches, the total $\Delta E$ value between the mean measured pixel color and the standard color value was 30.669 units. Table 2 shows the $\Delta E$ errors after color correction by the $P_3$, $P_6$, $P_8$, $P_9$, and $P_{11}$ polynomials. Based on the results shown in Table 2, the $P_{11}$ polynomial was selected for color calibration during the remainder of the experiments. FIGS. 8-12 show the average $\Delta E$ values for the all the colors from the standard color chart, before and after the calibration procedure using the $P_3$, $P_6$, $P_8$, $P_9$, and $P_{11}$ polynomials. FIG. 13 shows the 24 colors of the Macbeth Color Checker Chart before and after calibration using $P_{11}$. A typical $P_{11}$ transformation matrix recovered by the non-linear regression is:

$$\Theta_{RGB \to sRGB} = \begin{pmatrix} -3.6954 & -2.4108 & -4.8786 \\ 4.7842 & 2.0067 & 3.9868 \\ 4.7226 & 4.1387 & 7.8548 \\ 4.4176 & 2.1290 & 9.7939 \\ -0.8709 & 1.2966 & -3.3127 \\ -0.3721 & 1.8119 & -5.4017 \\ -2.6929 & -0.8579 & -6.0557 \\ -1.3181 & -1.2089 & -0.7149 \\ -2.9267 & -2.7037 & -4.2334 \\ -2.4727 & -1.5390 & -4.5668 \\ -1.5018 & -3.5883 & 6.1412 \end{pmatrix}^T \quad (24)$$

where the first column contains the polynomial coefficients for the red channel, the second column contains the polynomial coefficients for the green channel and the third column contains the polynomial coefficients for the blue channel. The superscript T in the equation stands for the transpose of the matrix.

TABLE 2

Comparison of maximum and mean $\Delta E$ between the measured colors and the standard color values for 24 colors as a function of calibration polynomials.

| Polynomial | Max $\Delta E$ | Mean DE |
|---|---|---|
| $P_3$ | 62.4235 | 20.3190 |
| $P_6$ | 43.8753 | 15.2015 |
| $P_8$ | 33.5486 | 14.6780 |
| $P_9$ | 40.3486 | 15.0475 |
| $P_{11}$ | 29.5809 | 12.9010 |

Reproducibility and sensitivity to illumination was assessed by measuring the color of the standard patches at three different heights (1, 1.5, and 2 cm above the patch). The average $\Delta E$ difference between repeated measurements before calibration was 0.31 units, while the average $\Delta E$ change between the repeated measurements after calibration was 0.19 units.

4.4 Calibration of Images from a Video Using Polynomial Regression

Figure 14:
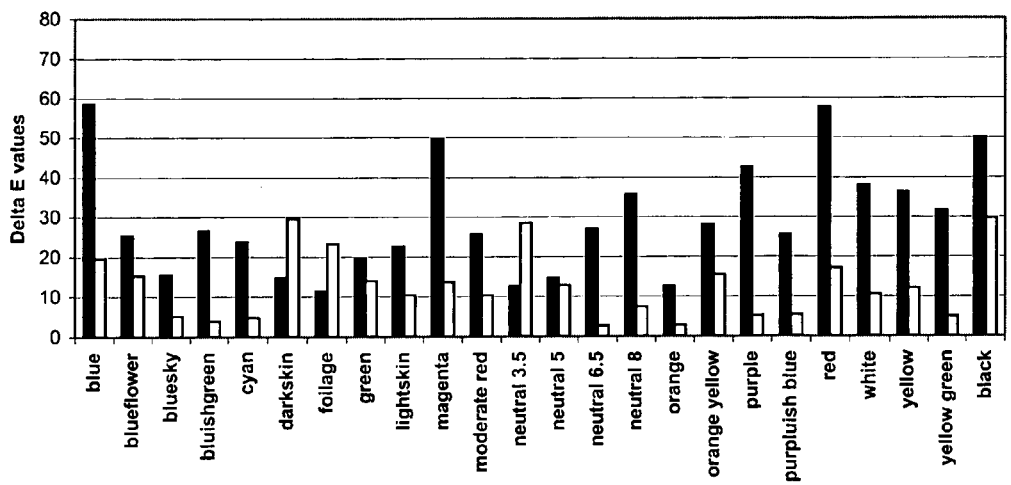
FIG. 14 is a plot showing $\Delta E$ values before and after calibration for video images using polynomial $P_{11}$. The colors correspond to the 24 colors on the Macbeth Color Checker Chart.

The images of the 24 colors from the standard Macbeth Color Chart were imaged and recorded in a video. At the same time these images were also stored in the memory of the system as may usually be done. These images were then calibrated using the polynomial regression method. The $\Delta E$ values before and after calibration of the images from the video and the images that were stored directly into the system from the bronchoscope were evaluated and compared. Table 3 gives the comparison between the average $\Delta E$ values before and after calibration of the 24 colors from the video and from the images stored in the system directly using the $P_{11}$ polynomial. It should be noted that the images taken from the video may not be the same frame that was captured directly from the bronchoscope, though they are images of the same color sample. FIG. 14 shows the $\Delta E$ values before and after calibration using $P_{11}$ for the images taken from the video.

TABLE 3

Comparison between the average $\Delta E$ values before and after calibration for the images taken from the video and the images taken directly from the bronchoscope.

| Type of image used | $\Delta E$ before calibration using $P_{11}$ | $\Delta E$ after calibration using $P_{11}$ |
|---|---|---|
| Images taken directly from the memory of the system | 30.669 | 12.9010 |
| Video images | 29.4406 | 12.7004 |

4.5 Calibration Using Look Up Table

Figure 7B:
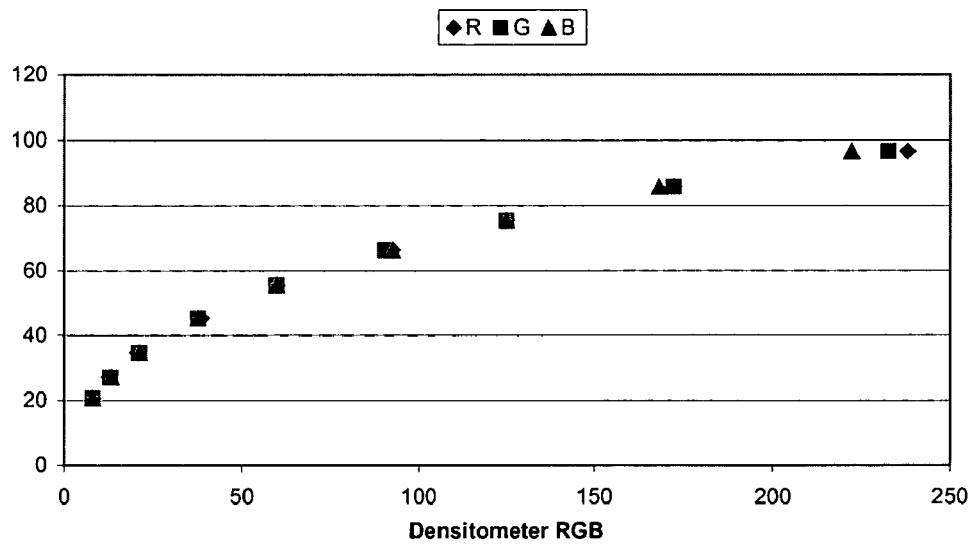
FIG. 7B is a plot showing the relationship between the RGB values of the nine gray levels from the densitometer against their lightness value.
Figure 8:
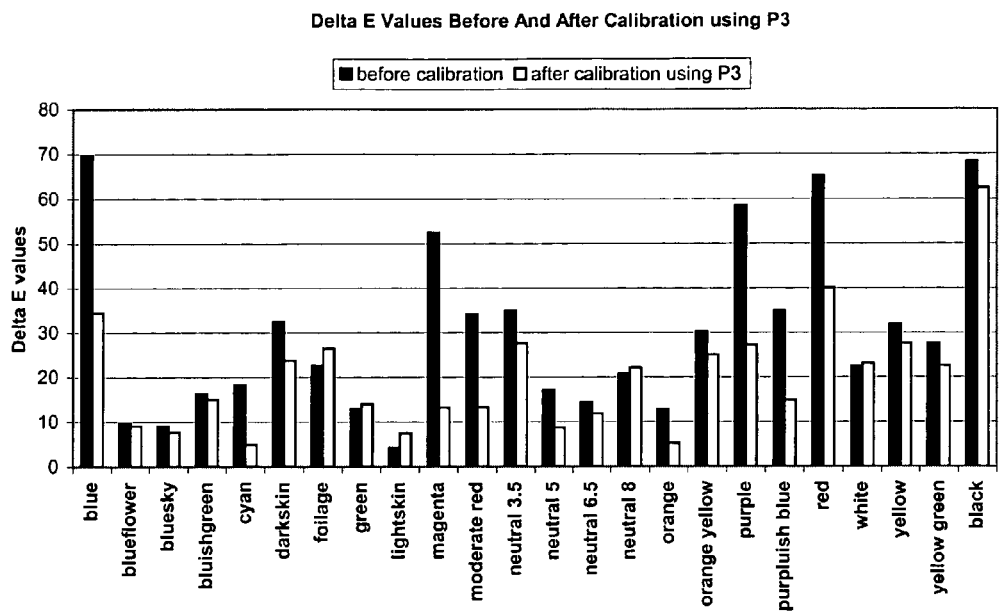
FIG. 8 is a plot showing $\Delta E$ values before and after calibration using polynomial $P_3$. The colors correspond to the 24 colors on the Macbeth Color Checker Chart.
Figure 9:
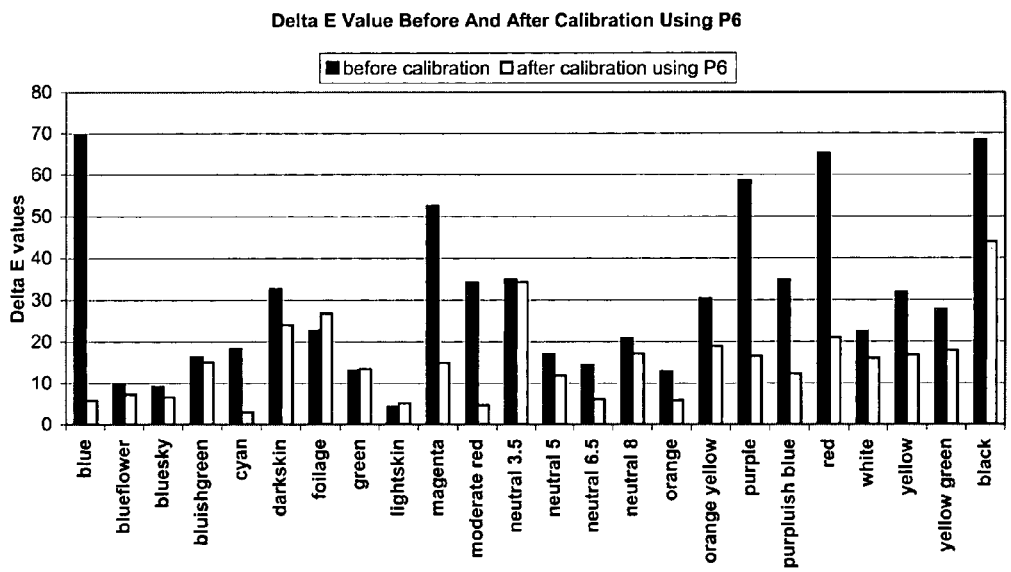
FIG. 9 is a plot showing $\Delta E$ values before and after calibration using polynomial $P_6$. The colors correspond to the 24 colors on the Macbeth Color Checker Chart.
Figure 10:
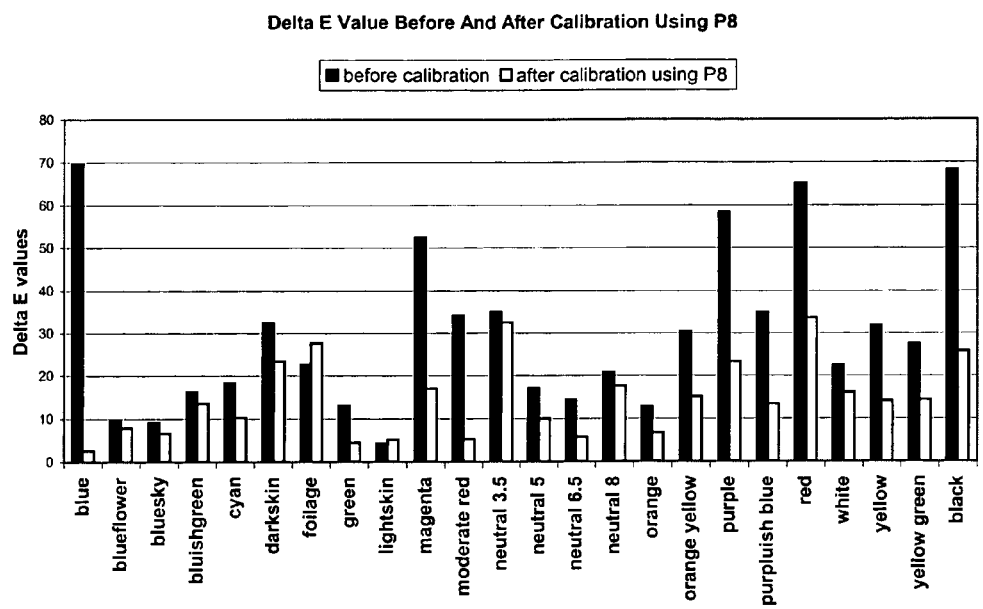
FIG. 10 is a plot showing $\Delta E$ values before and after calibration using polynomial $P_8$. The colors correspond to the 24 colors on the Macbeth Color Checker Chart.
Figure 11:
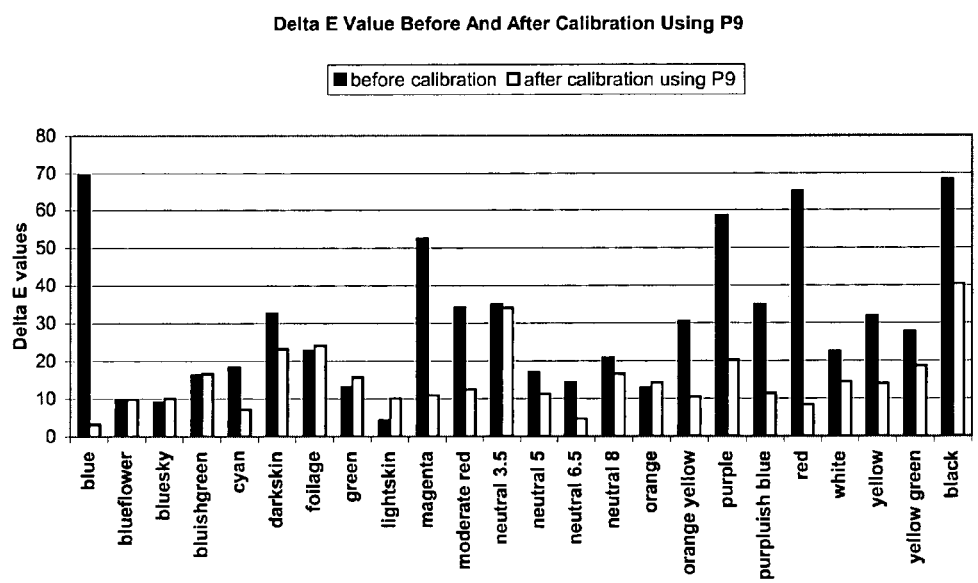
FIG. 11 is a plot showing $\Delta E$ values before and after calibration using polynomial $P_9$. The colors correspond to the 24 colors on the Macbeth Color Checker Chart.
Figure 12:
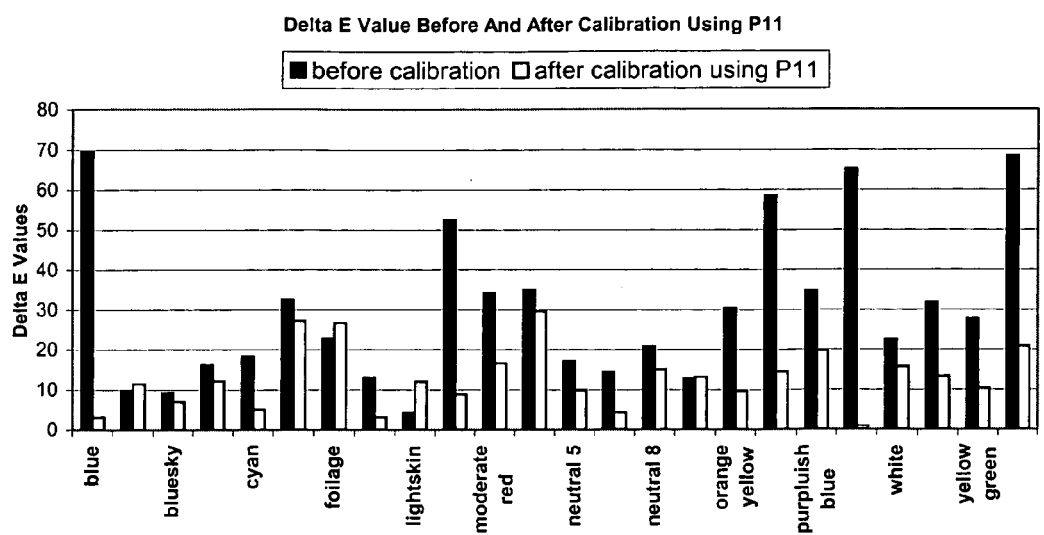
FIG. 12 is a plot showing $\Delta E$ values before and after calibration using polynomial $P_{11}$. The colors correspond to the 24 colors on the Macbeth Color Checker Chart.

A plot between the system R, G, and B values and their luminance value $L^*$ was made as shown in FIG. 7A and a plot between the R', G', and B' values of the gray levels from the densitometer and their luminance values $L^*$ was made as shown in FIG. 7B. The look up table (LUT) was determined by following the procedure described above. The equations determined from the graphs were used to determine the LUT and are given below:

$$R = 0.0419 \times (L^*)^2 - 1.9408 \times L^* + 38.7736, \quad (25)$$

$$B = 0.0392 \times (L^*)^2 - 1.8991 \times L^* + 40.9017, \quad (26)$$

$$B = 0.0183 \times (L^*)^2 + 1.3201 \times L^* - 44.3377, \quad (27)$$

$$f'(L^*) = R' = G' = B' = 0.0356 \times (L^*)^2 - 1.2952 \times L^* + 21.6053. \quad (28)$$

Equations 25 to 27 are the equations of the system R, G, and B. And the equation 28 is the equation from the densitometer value where R', G', and B' are the densitometer RGB values.

After the LUT was obtained using the gray scale target, it was used to calibrate the colors from the Macbeth Color Checker Chart. All of the 24 colors were imaged separately. The automatic gain control (AGC) of the bronchoscope adjusts the intensity of the light depending on the brightness of the object. Therefore, these 24 colors may be taken at slightly varying intensities of light. The area of the chart with the 24 colors was large and could not be imaged in one field of view of the bronchoscope. If it has to be imaged in one field of view, the distance between the distal end of the bronchoscope and the chart is very large, which reduces the intensity of light reaching the chart, thus making the colors look very dark. Therefore, all the colors were imaged separately; this did not minimize the effect of AGC.

Figure 15:
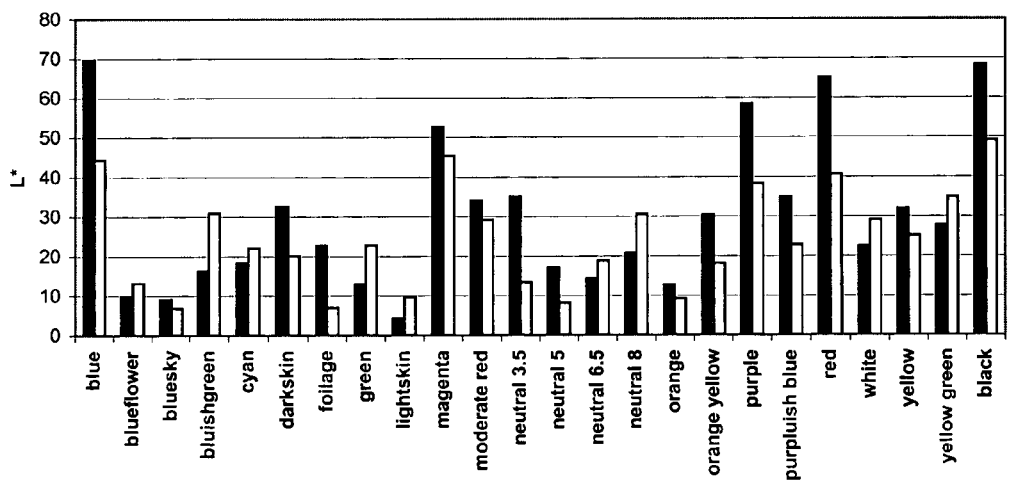
FIG. 15 is a plot showing $\Delta E$ values before and after calibration using a look up table (LUT). The colors correspond to the 24 colors on the Macbeth Color Checker Chart.

FIG. 15 shows the ΔE value of the 24 colors before and after calibration using the LUT. Table 4 shows the comparison between the average ΔE values after calibration between the various polynomials used in the polynomial regression method and the ΔE value after calibration using LUT method.

TABLE 4

Comparison between the Average ΔE values of the various polynomials used in the polynomial regression method and the average ΔE value from the LUT technique.

| Polynomials or technique used | Average ΔE |
| --- | --- |
| $P_3$ | 20.3190 |
| $P_6$ | 15.2015 |
| $P_8$ | 14.6780 |
| $P_9$ | 15.0475 |
| $P_{11}$ | 12.9010 |
| LUT | 24.587 |

To assess the precision and reproducibility of the exemplary imaging system discussed above, the following steps were taken.

3.3 Precision and Reproducibility of the Imaging System

To assess the precision and reproducibility of the color measurements, repeat acquisitions of the standard color chart were taken at three different distances. To reduce the effects of direct reflection of the light from the xenon source, the bronchoscope was placed at a 45° angle to the surface of the color chart. These images were acquired in a dark room with the only light source being the light source of the bronchoscope. The images were acquired at 1, 1.5, and 2 cm distance from the color chart. The images from the bronchoscope were then transformed to the device independent color space using the polynomial regression technique. The images were then converted to CIE XYZ and CIE L*a*b* color spaces. The ΔE value can be used to assess color differences; here, the ΔE value may be used to determine color variation as a function of distance.

Reproducibility was also assessed during the human studies discussed below. While acquiring images from humans, the same anatomic region was acquired twice by the physician. Sample regions from these two images were then converted to the device independent color space. The respective color channels were then compared for the corresponding regions from the two images to assess the reproducibility of the system.

5. Precision of the Imaging System Using Video

To access the precision of the system, when the images were taken from a pre-recorded video, all the 24 colors from the Macbeth color chart was imaged and recorded in a video. The colors were imaged from three different distances between the color chart and the bronchoscope as before. Also, the bronchoscope was kept at an angle of 45° similar to what was done before. These images were then transformed to the device independent color space using the polynomial regression technique. The images were then converted to CIE XYZ and CIE L*a*b* color spaces. Then the ΔE value was evaluated and this value was used to assess the precision of the system using the images from a video when compared to images acquired in real time.

Normal color medical image data may be acquired and put into usable form for practicing embodiments of the present methods. An example of how this was achieved using the exemplary imaging system discussed above, and a discussion of the results follows. The following also includes a discussion of one manner of comparing a subject color medical image (e.g., of the smoker and/or cystic fibrosis subjects) to normal color medical image data, and how abnormal pixels from the subject color medical images may be identified.

6. Human Studies

Nine normal, three cystic fibrosis, and one normal heavy smoker subjects were enrolled in a study after informed consent. The normal volunteers were lifelong non-smokers, with no clinical history or examination findings of respiratory disease. They were on no medication. All bronchoscopy procedures were performed under awake sedation, using topical lidocaine anesthesia, and IV fentanyl/midazolam to effect. The images recorded for this study were taken immediately after local airway anesthesia was achieved, and were systematically taken of regions prior to the passage of the bronchoscope through that region. No topical vasoconstrictors were used.

Figure 16:
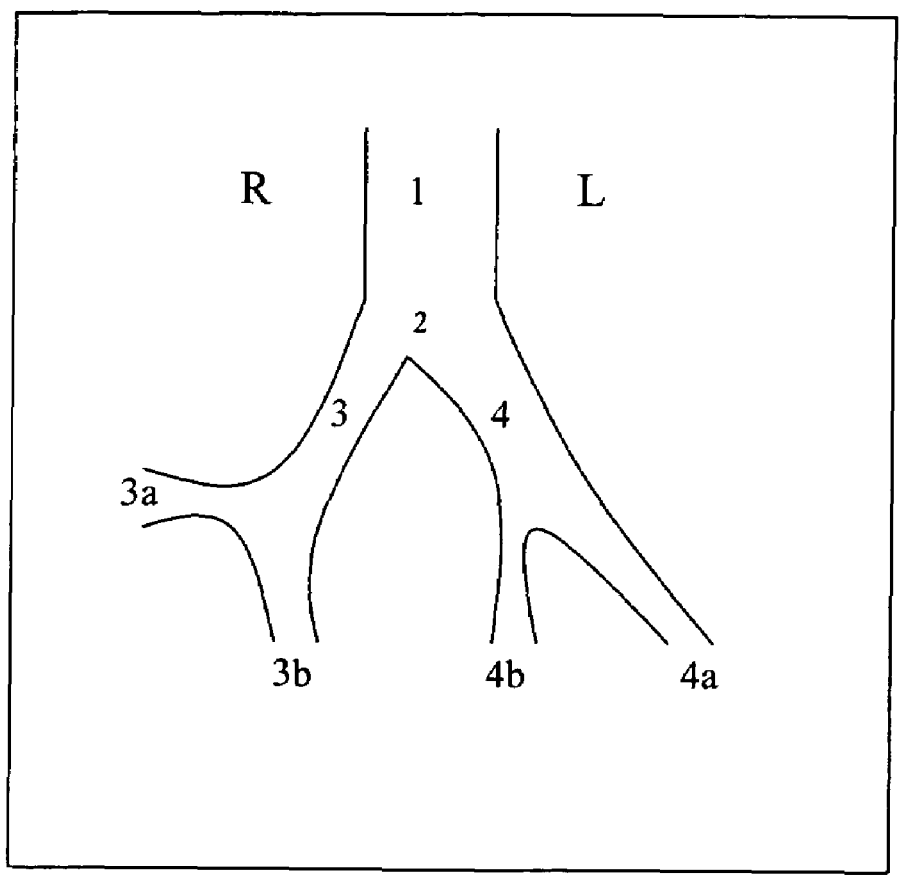
FIG. 16 shows the specific regions of interest examined in the human subjects as discussed below: 1. Distal Trachea; 2. Main Carina; 3. Right Main Bronchus; 3a. Right Upper Lobe Orifice; 3b. Bronchus Intermedius; 4. Left Main Bronchus; 4a. Left Upper Take Off; 4b. Left Lower Take Off.
Figure 17A:
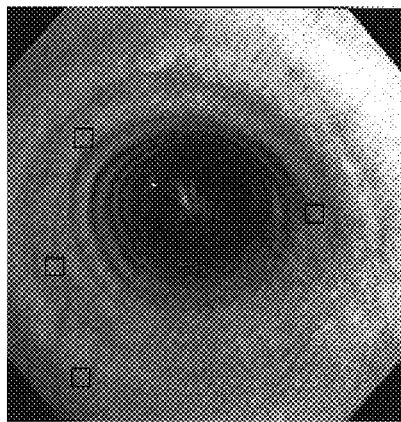
Figure 17B:
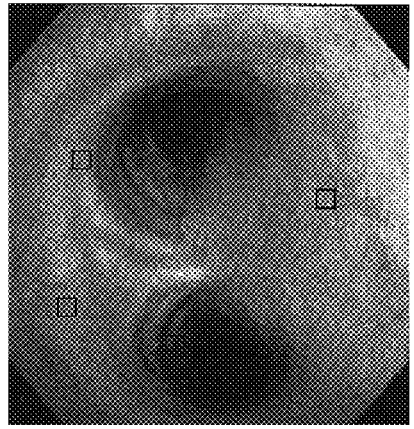

Images were recorded (directly into the computer and on videotape) in the distal trachea to include the main carina, in the right main bronchus to include the bronchus intermedius and right upper lobe orifice, and at the distal end of the left main bronchus to include the left upper and left lower lobe take-offs (see FIG. 16). In most cases images were also recorded more distally in the left upper lobe, usually the segments of the lingular, in the right upper lobe, usually the anterior segment, and in the right middle lobe.

For each image of every subject a physician manually selected several small regions of interest of about 50×50 pixels. The regions were selected to be within the bronchoscopic field where diagnostic decisions are usually made. The color values of the pixels in these regions were then transformed to sRGB color space and then to HSV space to tabulate the hue and saturation of the colors found in the region. Example images from a normal and a cystic fibrosis subjects are shown in FIGS. 17A-17D and 18, respectively, with sample regions used for analysis marked on them with squares. Also, FIGS. 17A-17D show four different regions from the normal human airway.

Figure 19:
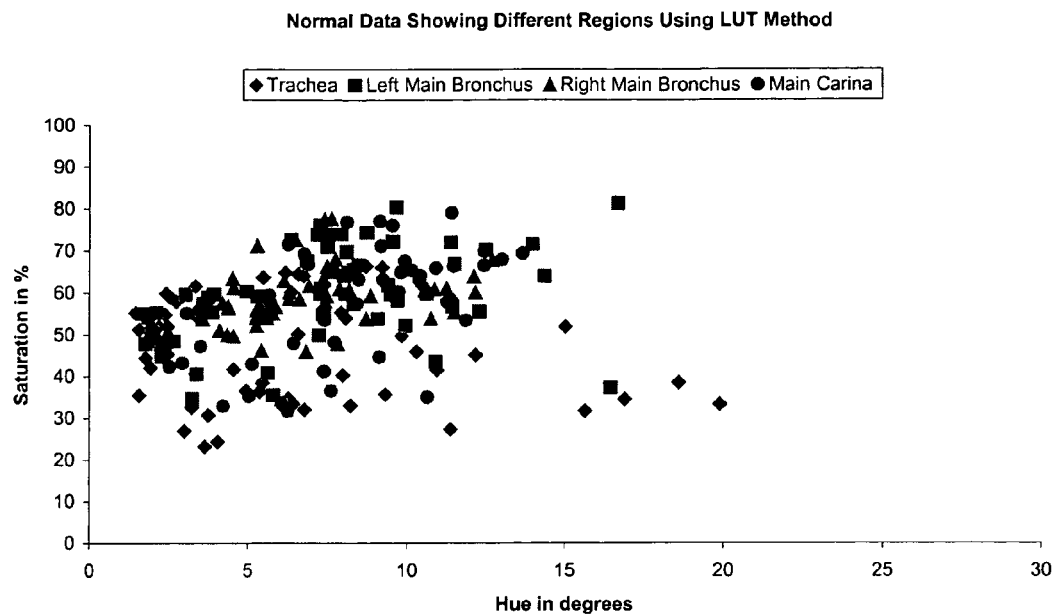
FIG. 19 is a hue and saturation plot for the different regions in normal subjects using the LUT technique for calibration.
Figure 20:
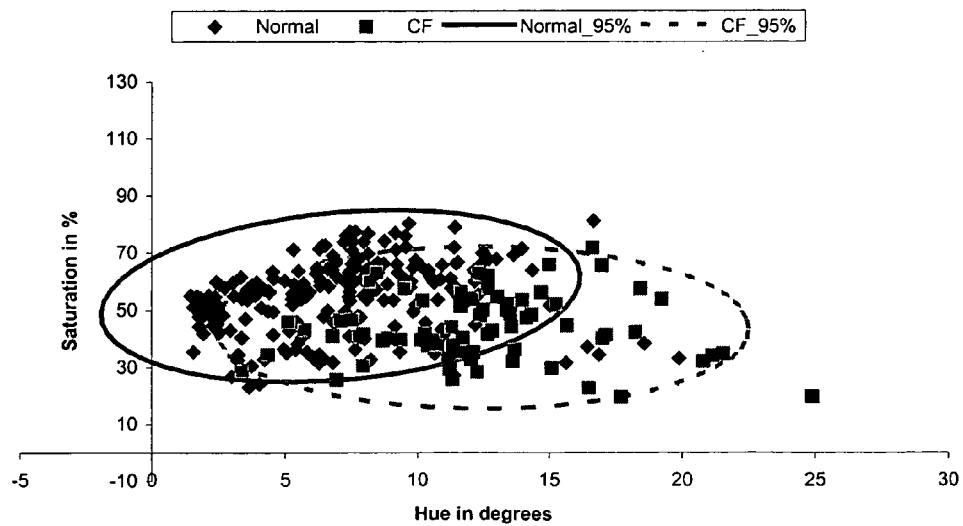
FIG. 20 is a comparison plot between hue and saturation of the normal and the CF subjects after calibrating the data using the LUT technique. The graph also shows the 95% confidence ellipse for both the normal and the CF data.
Figure 21:
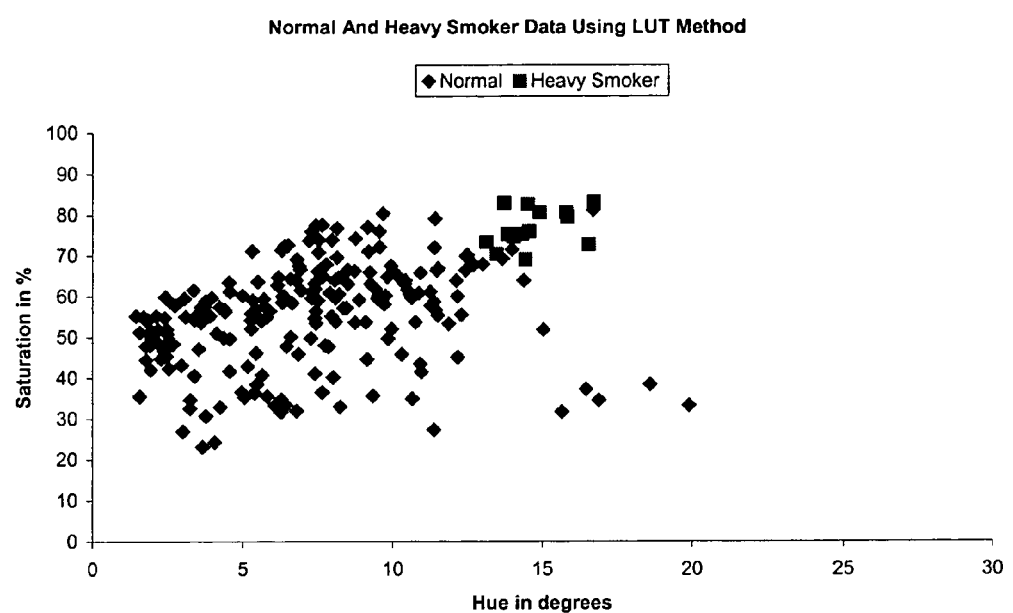
FIG. 21 is a comparison plot between hue and saturation of the normal subjects and the heavy smoker subject after calibrating the data using the LUT technique.

The regions selected by the physician were calibrated using the LUT technique and the polynomial regression technique. FIG. 19 shows the scatter plot between the hue and saturation values for the different regions in normal subjects using the LUT technique. FIGS. 20 and 21 show scatter plots between the hue and saturation values to compare the normal and CF subjects with their 95% confidence ellipse overlaid in the graph, and a comparison between normal subjects and heavy smoker subject respectively using the LUT technique. The confidence ellipse was determined by using the correlation matrix for each set of data and their mean point as the center. The correlation matrix for the normal and the CF data is given below for the LUT technique:

$$C_1 = \begin{bmatrix} 1 & 0.2152 \\ 0.2151 & 1 \end{bmatrix}. \qquad 29$$

$$C_2 = \begin{bmatrix} 1 & -0.0095 \\ -0.0095 & 1 \end{bmatrix}. \qquad 30$$

where $C_1$ is the correlation matrix for the normal data using LUT technique with the center of the ellipse as (7.13,55.017)

and $C_2$ is the correlation matrix for the CF data using the LUT technique with the center of the ellipse as (12.43,43.91).

Figure 22:
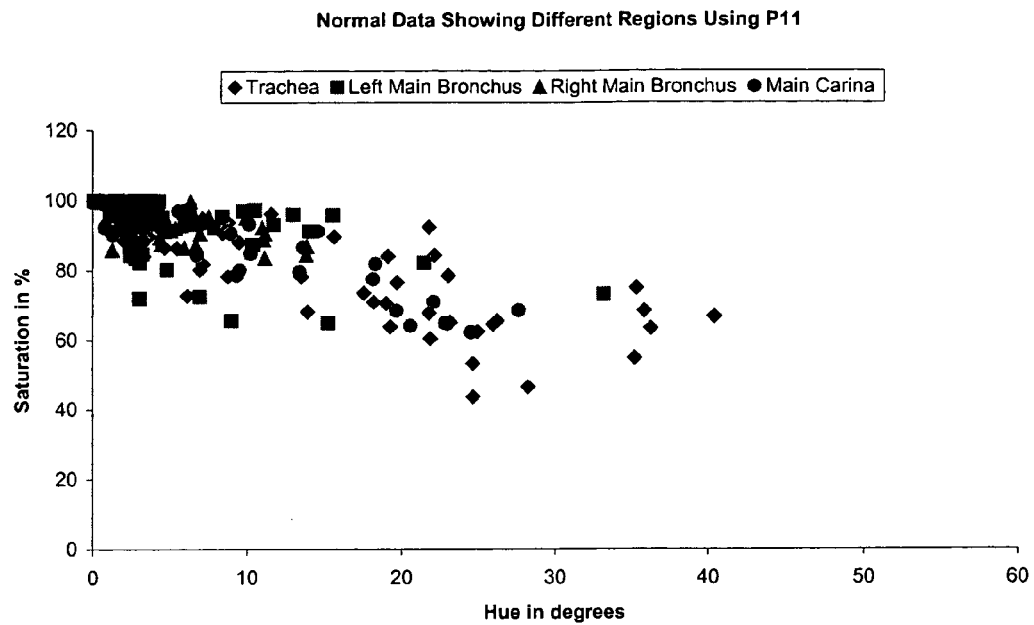
FIG. 22 is a hue and saturation plot for the different regions in normal subjects using the polynomial regression ($P_{11}$) technique for calibration.
Figure 23:
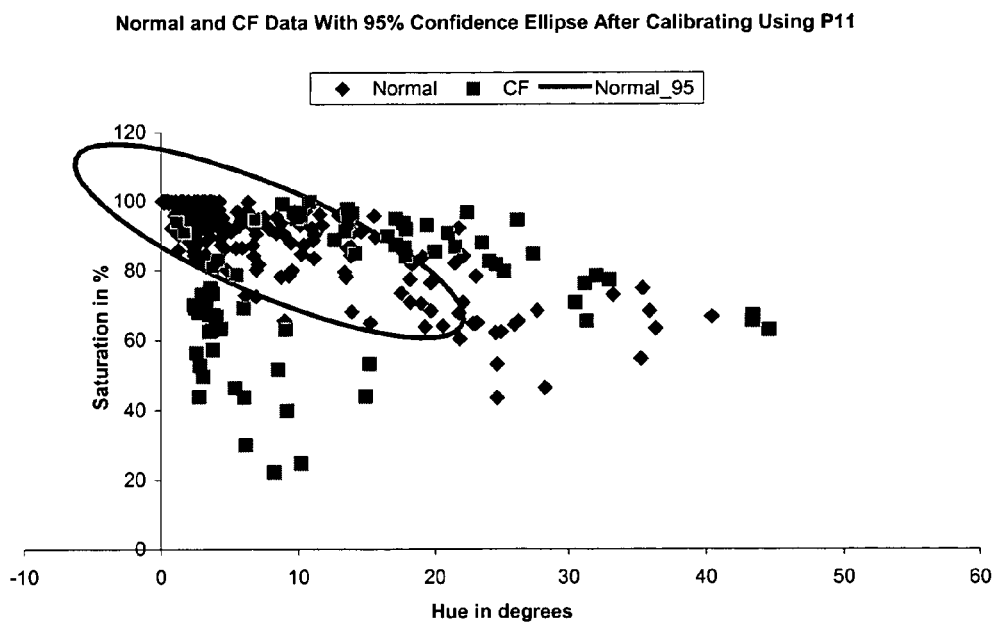
FIG. 23 is a comparison plot between hue and saturation of the normal and the CF subjects after calibrating the data using the polynomial regression ($P_{11}$) technique. The graph also shows the 95% confidence ellipse for the normal data.
Figure 24:
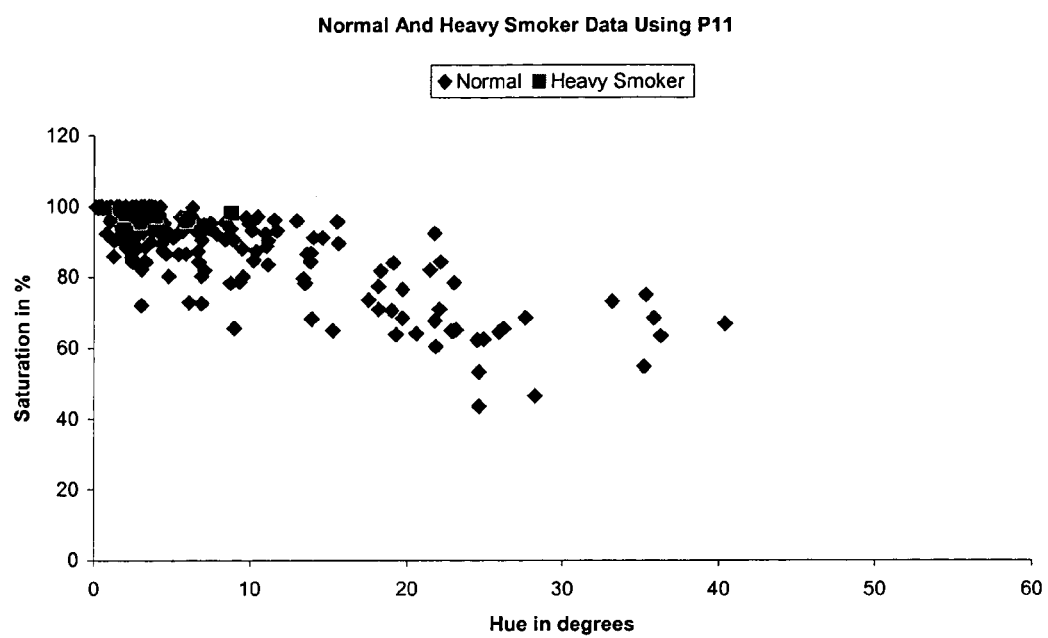
FIG. 24 is a comparison plot between hue and saturation of the normal subjects and the heavy smoker subject after calibrating the data using the polynomial regression ($P_{11}$) technique.

Table 5 gives the average hue and saturation values for normal and cystic fibrosis subjects for different regions in the airway using the LUT technique. FIGS. 22-24 show scatter plots between hue and saturation values for different regions in normal subjects, comparison between normal and CF with 95% confidence ellipse for the normal data overlaid on the graph, and comparison between normal and heavy smoker subject, respectively. The 95% confidence ellipse for the normal data calibrated using the polynomial regression technique is determined using the correlation matrix C3 and the center of the ellipse (here, (7.92,88.60)):

$$C_3 = \begin{bmatrix} 1 & -0.7960 \\ -0.7960 & 1 \end{bmatrix}. \quad (31)$$

Figure 25:
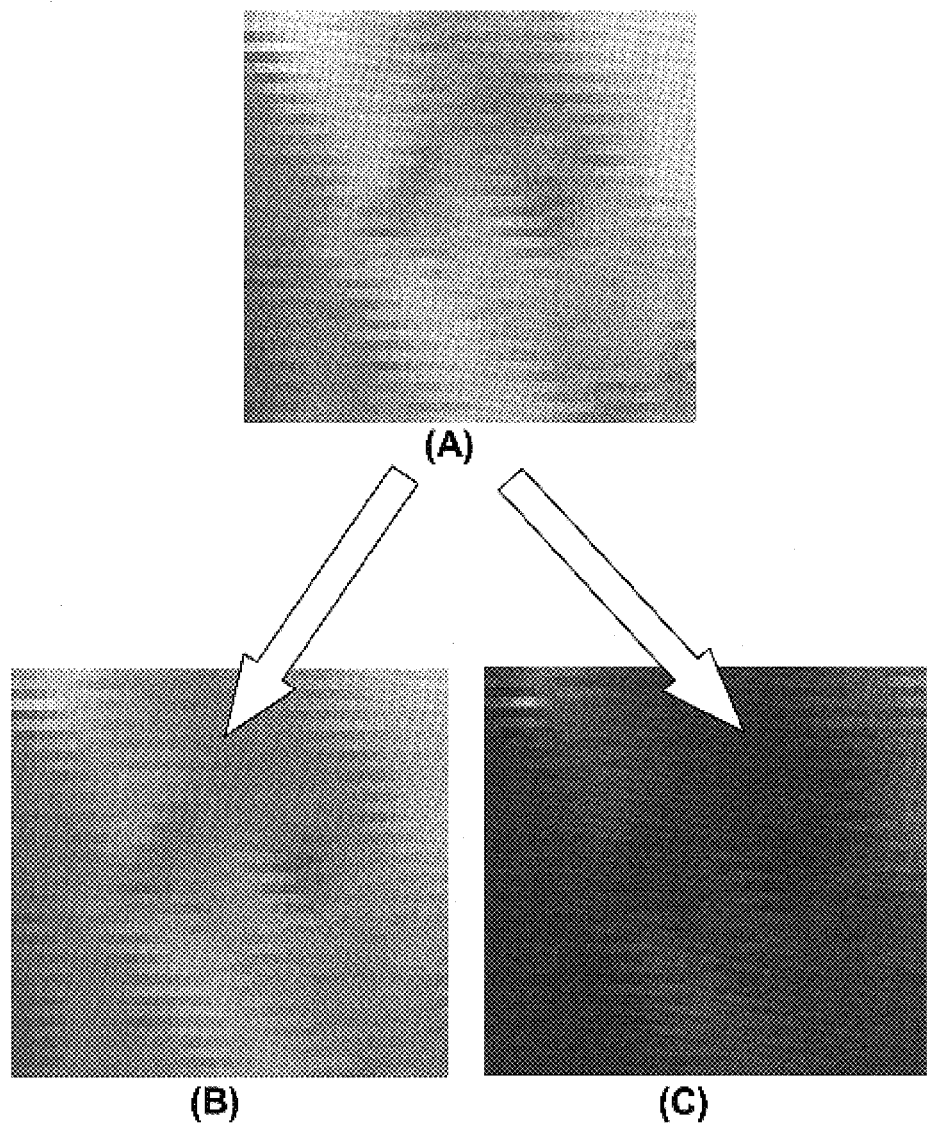
FIG. 25—(A) Shows the original sample region from a normal subject. (B) Shows the sample as it looks after calibrating using the LUT technique. (C) Shows the sample as it looks after calibrating using the polynomial regression ($P_{11}$) technique.

Table 6 gives the average hue and saturation values for normal subjects and cystic fibrosis subjects for different regions in the airway using the polynomial regression ($P_{11}$) technique. FIG. 25 shows a sample region from a normal bronchoscopic image as it looks before and after calibration using the LUT technique and the polynomial regression technique, respectively.

TABLE 5

The hue and saturation values for different regions in the airway for normals and cystic fibrosis subjects using LUT technique for calibration. Hue and saturation are mean plus or minus standard error.

(a) Normals

| Regions | Number of samples | Hue in degrees | Saturation in |
|---|---|---|---|
| Left Main Bronchus | 60 | 7.37 ± 0.48 | 59.42 ± 1.42 |
| Right Main Bronchus | 45 | 6.92 ± 0.39 | 58.63 ± 1.11 |
| Trachea | 66 | 6.34 ± 0.56 | 47.06 ± 1.45 |
| Main Carina | 49 | 8.09 ± 0.44 | 57.02 ± 1.84 |

(b) Cystic Fibrosis (CF)

| Regions | Number of samples | Hue in degrees | Saturation in % |
|---|---|---|---|
| Left Main Bronchus | 19 | 11.8 ± 0.45 | 48.91 ± 1.68 |
| Right Main Bronchus | 13 | 10.93 ± 0.84 | 42.66 ± 3.14 |
| Trachea | 19 | 13.9 ± 0.86 | 42.67 ± 1.79 |
| Main Carina | 4 | 14.32 ± 3.53 | 35.81 ± 5.45 |

TABLE 6

The hue and saturation values for different regions in the airway for normals and cystic fibrosis subjects using polynomial regression ($P_{11}$) technique for calibration. Hue and saturation are mean plus or minus standard error.

| Regions | Number of samples | Hue in degrees | Saturation in |
|---|---|---|---|
| (a) Normals | | | |
| Left Main Bronchus | 60 | 5.19 ± 0.74 | 92.46 ± 1.11 |
| Right Main Bronchus | 45 | 4.9 ± 0.53 | 93.1 ± 0.69 |
| Trachea | 66 | 12.78 ± 1.40 | 81.77 ± 1.77 |
| Main Carina | 49 | 7.47 ± 1.05 | 88.90 ± 1.47 |
| (b) Cystic Fibrosis (CF) | | | |
| Left Main Bronchus | 19 | 13.54 ± 1.59 | 83.8 ± 2.69 |
| Right Main Bronchus | 13 | 10.96 ± 1.62 | 69.7 ± 4.86 |
| Trachea | 19 | 16.92 ± 2.91 | 73.76 ± 2.78 |
| Main Carina | 4 | 5.40 ± 1.03 | 58.73 ± 12.49 |

7. Discussion

The color calibration was done using two different techniques: the polynomial regression technique and the look up table technique using the gray scale target. Different polynomials were used to perform the polynomial regression technique. The $P_{11}$ polynomial gave the least $\Delta E$ value. This procedure reduced the overall $\Delta E$ error on the standard color patches from 30.699 to 12.9010 units, which compares favorably with the results presented in Haeghen et al., 2000. Most of the images of the 24 color patches improved noticeably after calibration (FIG. 12), however, some shades of green and pure white were still far from the standard values after calibration. The remaining shades of gray were close to the standard values after color calibration.

The color calibration procedure also improved reproducibility of the standard color patches. The average $\Delta E$ value between repeated measurements of the same color before calibration was 0.31 units, while the average $\Delta E$ change between repeated measurements of the same color after calibration was reduced to 0.19 units.

The color calibration using the look up table reduced the $\Delta E$ error on the standard color patches from 30.699 to 24.587. This improvement in $\Delta E$ value is less than the improvement of the $\Delta E$ value achieved using the $P_{11}$ polynomial in the polynomial regression technique. However, this is because the standard patches are imaged separately due to the large size of the color chart. This does not minimize the effect of the automatic gain control (AGC) of the bronchoscope. Because of this, when the 24 colors are imaged separately the illumination for pure white will reduce, thus making the white look like a shade of gray. Similarly, for pure black the illumination will increase and make it again look like another shade of gray. This effect was reduced when all the nine gray levels in the gray scale target were taken in one field of view because of relative illumination for all the nine gray levels.

In the case of the polynomial regression technique, even if the color patches were imaged separately the effect of AGC is minimized by first inverting the gamma transformation of the imaging system and then trying to find an appropriate transform between the device dependent RGB (system RGB) and the device independent RGB (sRGB) color spaces. Basically this procedure is a least square fit between the two color spaces. The polynomial regression technique will give better results if there are more intermediate standard colors with known values. This will then make the transform a better estimate, which would mean that a larger training set would be used. If the numbers of color patches were reduced from 24 to a smaller number, the accuracy of the system would be reduced (Kang, 1997). Also this method gives a better accuracy when more number of polynomials is used for the regression (Table 2).

In the technique using the look up table, the correction is done in the red, green and blue color channels, thus adjusting the gamma value of the system. This technique is not an approximation like the polynomial regression and does not estimate the in-between colors as in the case of the polynomial regression technique; instead, it corrects the values of the color channels itself. For this reason, all the 24 colors may be not used for calibration. Additionally, in the case of the LUT technique, the 24 colors may be not imaged separately as in the case of the polynomial technique; instead, all the nine gray levels may be imaged at the same time. Thus, this reduces the total time taken for calibration. In the LUT technique, the calibration is dependent only on the nine gray levels. Hence this method may not use a large training set as in the case of polynomial technique.

It is seen that when the polynomial regression technique was applied to the color samples from the color chart, it approximates the colors from the chart reasonably and the average E value for these 24 colors is low when compared to the average E value for the same colors using the LUT technique. However, when the polynomial regression technique is applied to the human data, which has colors other than the colors from the chart, we see that this technique calibrates the image such that the estimated color is close to one of the colors from the chart. Subjectively, when both these techniques were applied to the human data, it can be seen that the look up table technique corrects the image to a color that looks close to a human tissue, where as the polynomial regression technique corrects the image to a color close to one of the shades of red found in the color chart (FIG. 25). There are only three colors in the 24-color chart that describe colors similar to red. The polynomial regression technique tries to approximate the colors from the human data to one of these colors in the color chart, thus making the colors from the human data very close to bright red, which is not the actual color we would expect to see in a human tissue if it were not inflamed. The LUT technique corrects each channel separately without using estimation to any standard color. The colors seen after using this method for calibration are close to the tissue color we would expect. Also, when the human data is obtained, the whole image is in the same field of view of the bronchoscope, which minimizes the effect of AGC. The human data is calibrated using both the techniques and the results were recorded.

After calibrating the human data using the LUT technique, it can be observed from Table 5 that there is not much change or gradient in color within the normal subjects from the trachea through the main carina and into the left and right main bronchus. It is seen from FIG. 15 that the normal region is clustered around 0 to 10 degrees hue and 20 to 80 saturation. Also, it is observed from FIG. 19 that for cystic fibrosis subjects the regions has larger hue and are less saturated when compared to the normal subjects. From that figure it can be noted that the normal region are clustered in one part of the graph and the region from the CF subjects are clustered in another part, though there is a small region of overlap. A similar result is observed when the data from the heavy smoker subject is studied and compared to the normal subject. As seen in FIG. 21, the regions from the heavy smoker subject is more saturated than the normal and the cystic fibrosis subjects. This may be because for heavy smokers the airway is more inflamed than the normal subjects. Hence the regions of the heavy smoker would be more saturated.

After calibrating the images using the polynomial regression ($P_{11}$) technique, it can be observed from Table 6 that there is a small gradient of color within the normal subjects from the trachea through the main carina and into the left and right main bronchus (FIG. 22). The trachea and the main carina have a slightly higher hue and are less saturated when compared to the left and the right main bronchus. The mean airway color at selected sites in the normal and the CF subjects shows differences in color saturation measurements. It can be seen from FIG. 23 that the normal regions is mostly along a diagonal and the regions from the CF subjects lie on either side of it. There is also a measurable color change in the normal heavy smoker when compared to the normal subjects (FIG. 24). The regions from the normal heavy smoker are very red and have very high saturation, which could because of the inflammatory affects of cigarette smoking.

A program that, as explained above, may be built to carry out the steps of the present methods may include functions that allow it to collect normal color medical image data. Those functions may be achieved in a mode that can be separate from the remainder of the modes or modules of the program, and may be triggered, for example, by selecting a "Collect normal patient data" option appearing on a graphical user interface (GUI) when the program is started. When such an option is selected, the program may continue to initialize as if normal patient analysis were being performed.

A frame-grabber can be not used when analyzing normal patient data. When the "Collect normal patient data" mode is selected and runs, a dialog may be shown on the GUI to alert the user that the bronchoscope should be correctly connected and turned on. If the program is to be used to analyze images stored on disk, then the bronchoscope can be not connected to the computer. In such a situation, any "Live" and/or "Grab" buttons that are provided (discussed below) should not be pressed, because this could damage the frame-grabber, and/or produce artifact(s) in the normal file being created.

A "create new patient study" dialog may be displayed on the GUI, and when the same occurs, the program may be configured such that it may be not possible to cancel the process; otherwise, a warning dialog may be displayed, informing the user that to collect normal patient data, a new patient study should be created in which to store the new patient data.

The program may then run the same as when normal patient analysis is performed (discussed below), except no comparisons are made to the normal data. This means that highlighting of the abnormal parts of the current image may be not performed (and therefore the threshold control may not operate), normal data histograms may be not plotted, and normal data statistics may be not shown. Histograms may still be shown for the current bronchoscope image.

A normal database may be created by either grabbing images directly from the bronchoscope during a normal patient study, or by analyzing the images collected during a patient study (using an "Open" button (discussed below)), after that study is completed.

During a normal patient study, each image grabbed using a "Grab" button or space-bar may be used to construct the normal color database. When the program is closed (or a new patient study is created) this data may be saved in the patient study directory, with the name (and .dat extension) that was selected in the preferences file (the default name for the collected data may be "NewNormalData.dat"). Collecting normal data during a procedure may not allow for careful selection of images, because an image is added to the data file as soon as the "Grab" button is pressed, even if it is blurred or contains artifact(s).

Alternatively, a series of images could be grabbed during the patient study, with the run mode set to "Perform normal patient analysis". Then the images can be examined after the procedure to select those that are neither blurred nor contain artifact(s). The program can then be run in the "Collect normal patient data" mode to analyze those selected images. To actually compile the normal data, the "Open" button may be used to individually open all the selected images, producing the normal data file. This technique allows the user to be more selective about the images used to create the normal data file.

When in the "Collect normal patient data" run mode, it may be not possible to open video sequences using the "Open" button. The creation of the normal data file may be done using still images only.

Once a normal data file has been created (as described above), it may often be useful to combine that normal data with other normal data collected during previous normal patient studies. Such a technique may be used to create a normal database containing the normal data collected from a large number of patients.

To combine two data files together (or to add new normal data to the current normal database), the program may be configured such that a "Combined Data Files" program may be run. This program may be a module of the program or a separate program. It may be part of the color analysis package, and may be run by double-clicking on a program icon that is provided.

Embodiments of the present methods may be performed without converting data from device dependent color space to device independent color space. For example, embodiments of the present methods may be performed using any suitable imaging system, such as the exemplary imaging system described above, and converting from red-green-blue (RGB) device dependent color space to hue, saturation and intensity (HSI) device dependent color space. Techniques for making such a conversion are discussed above.

After normal color medical image data has been collected, converted to HSI color space and stored, a subject color medical image may be compared to that data and abnormal pixels may be identified (see step 55 in FIGS. 1D and 1E) in accordance with, for example, the following functions.

8. Comparing and Identifying Abnormalities

Figure 26:
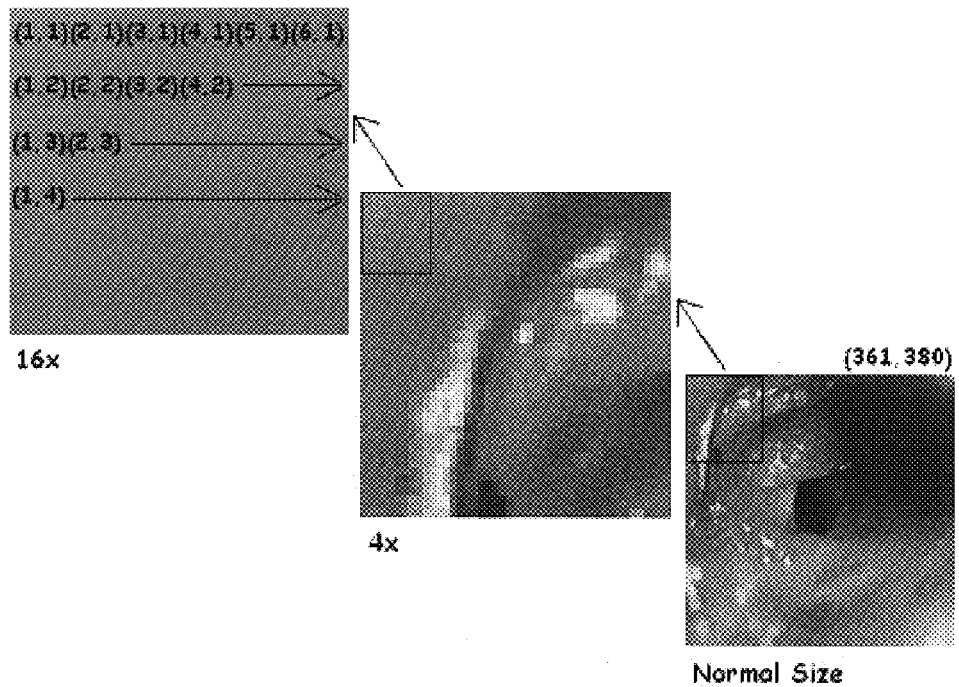
FIG. 26 shows enlarged portions of a sample image.

Once a subject color medical image has been obtained from an endoscope (e.g., the bronchoscope identified above), it is analyzed to determine if the color of the tissue is normal. Each image ROI (e.g., the contents of the "child" buffer) grabbed from the bronchoscope, may contain 361 rows and 380 columns of pixels. Each pixel in the image may be the same size, but each may have a different color measured as an RGB value. FIG. 26 shows an enlarged portion of a sample image, showing how it is composed of pixels, and how each pixel may be assigned a color and unique coordinate.

Figure 27:
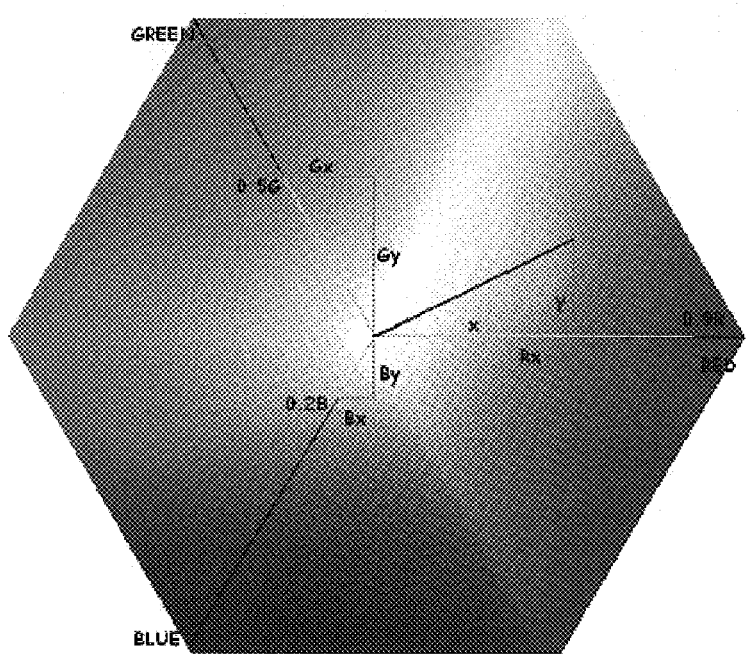
FIG. 27 is a diagram demonstrating how the location of a pixel on a color wheel may be determined from its RGB values.

After the program that is built grabs an image into the "child" buffer, it may display it in an image window (see step 32 in FIGS. 1F and 1G). Then the image may be analyzed pixel by pixel to show where the image pixels are located on the color wheel. This mapping process may be termed the "Map Back" function. During this process of mapping the pixels to the color wheel, the program may be effectively displaying the hue and saturation of each pixel in the image. This is because on the color wheel, the distance between the pixel location and the center is a measure of the saturation, while the angle between that line and the red axis is a measure of the hue. However, instead of actually calculating the hue and saturation for every pixel in the image, the program may convert an RGB value directly into a color wheel location using "vector" arithmetic. The red, green and blue components may be marked on their respective color wheel axes, with the distance from the center corresponding to the magnitude of that component. Then the x and y components of those red, green and blue vectors may be added together to find the location of that pixel on the color wheel. The diagram in FIG. 27 demonstrates how the location of a pixel with color RGB (128, 51, 230) may be determined. Note that that 128/256=0.5, 51/256=0.2, 230/256=0.9.

The end of the blue line represents the location of that pixel. The actual equations that may be used by the program to calculate the pixel's location may be derived trigonometrically, and are shown below:

$$x = R + \frac{G+B}{2} \qquad y = \frac{\sqrt{3}}{2}(G+B) \qquad (32, 33)$$

Figure 28:
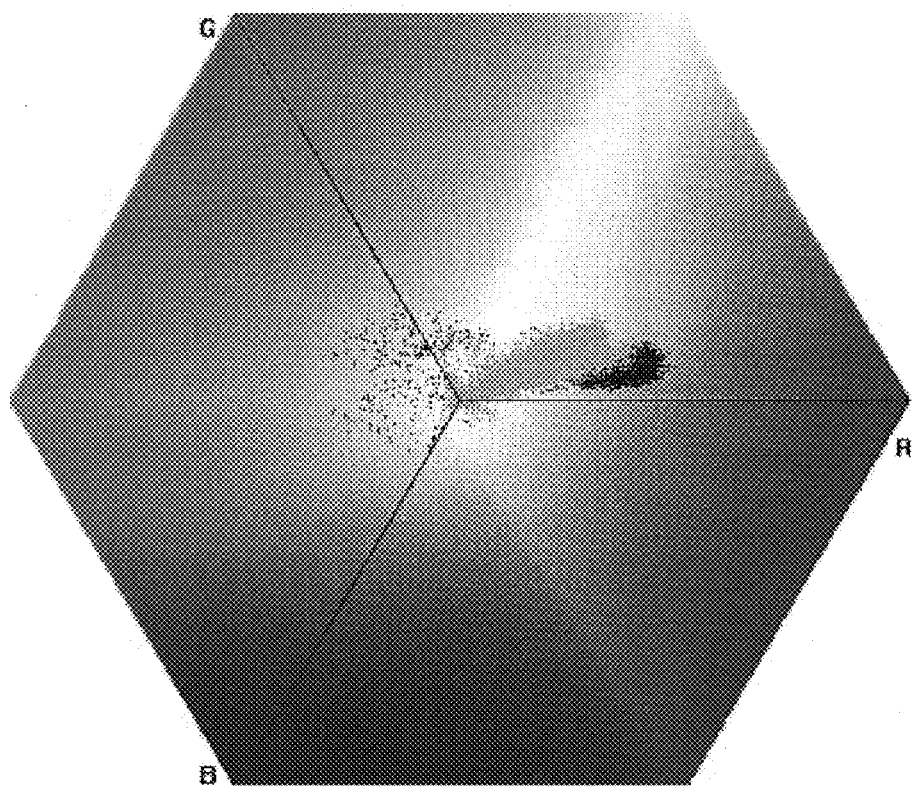
FIG. 28 is a diagram showing an example of pixels from a subject color medical image identified as normal or abnormal on a color wheel.

Once the location of the pixel on the color wheel is determined, it may be highlighted with, for example, a gray or black dot depending on whether that particular color wheel location is said to be normal or abnormal. This may be determined by examining the normal color wheel locations that may be stored in a filed termed the "NormalData.dat" file. If the particular location just calculated is one of those normal locations the dot may be gray, otherwise it may be black. FIG. 28 demonstrates how, in certain embodiments of the present methods, the pixels from an exemplary bronchoscope image may be mapped onto the color wheel, with gray pixels indicating normal colors and black pixels indicating abnormal colors. Thus, in some embodiments of the present methods, the identification of abnormal pixel(s) may include displaying the abnormal pixels on the subject color medical image(s) (see step 110 in FIG. 1D) (or a portion of the same; see step 110' in FIG. 1F) and/or displaying the abnormal pixel(s) on a color wheel in a color or colors (gray and black both being considered colors for this purpose) that are different from the color or colors used to display (or that would otherwise be used to display) normal pixels in those same locations (e.g., on the color wheel).

The color wheel mappings may therefore show the locations of all normally and abnormally colored pixels in the image.

Figure 29:
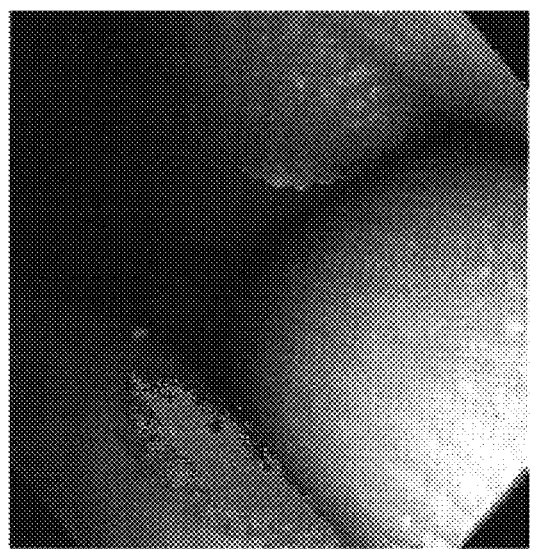
FIG. 29 is a diagram showing an example of abnormal pixels of a subject color medical image highlighted on the subject color medical image.

Once a pixel from the bronchoscope image is analyzed and determined to be abnormal, the corresponding location on the color wheel may be colored black to indicate that the image contains pixels of that particular color. Then the program may highlight that particular pixel on the original subject color medical image, so that the abnormal areas are highlighted in, for example, green. An example of the abnormal color highlighting is shown in FIG. 29. The color wheel mapping for this image is shown on the previous page. Therefore the abnormal areas (those highlighted in green) correspond to the black areas on the color wheel.

9. Calculating Statistics and Histograms

In certain embodiments of the present methods, the identification of an abnormal pixel or abnormal pixels may include calculating statistics and/or histograms related to the colors in the subject color medical image. Thus, the program may also be configured to calculate various statistics and histograms related to the colors in the subject color medical image. If these features are desired, the program can perform extra analysis on each image grabbed from the bronchoscope to create two separate histograms. Both histograms may be calculated in the same manner, but one may represent the distribution of pixels in terms of their saturation, and the other in terms of their hue. The saturation histogram may be produced by plotting the number of pixels with each integer value of saturation from zero to 100%. The hue histogram may be produced by plotting the number of pixels with each integer value of hue from zero to 360 degrees.

The program may be configured such that, during normal operation, it will plot the current bronchoscope image and normal data histograms simultaneously for both hue and saturation. To calculate the hue and saturation on every pixel in the image, the program may use the following formulae:

$$\text{saturation} = \sqrt{x^2 + y^2} \qquad \text{hue} = \tan^{-1}\left(\frac{y}{x}\right) \qquad (34, 35)$$

where x and y are calculated during the color wheel mapping process.

Figure 30:
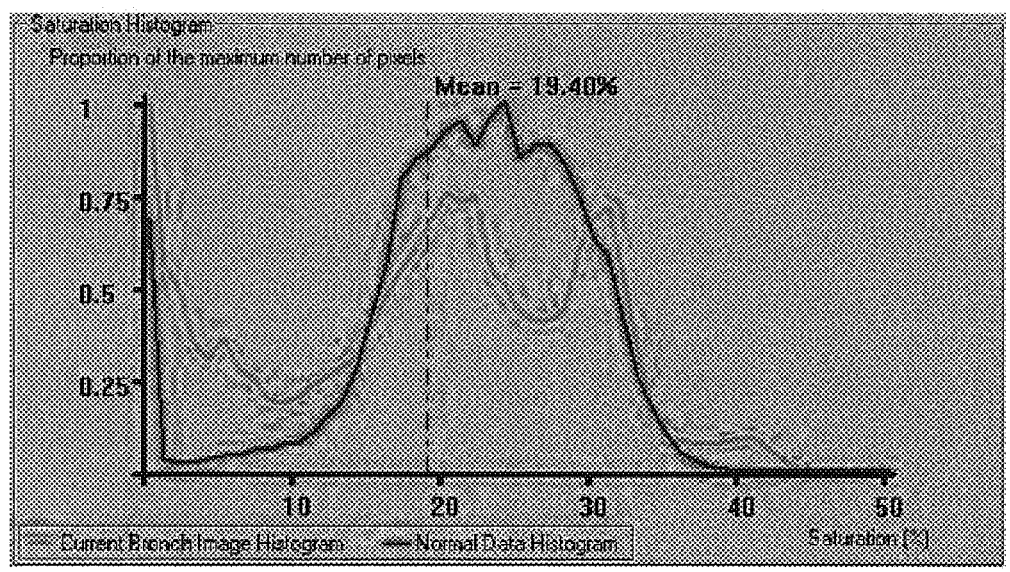
FIG. 30 depicts a graphical representation of a sample histogram showing the distribution of all pixels in a displayed image, in terms of their saturation.

A sample histogram showing the distribution of all pixels in the currently displayed image, in terms of their saturation, is shown in FIG. 30 (for the image and color wheel mappings shown above). The blue line shows the normal distribution of pixel saturations, while the green line shows the current image distribution. Because there are no pixels in the image with a saturation greater than 50%, the saturation axis only shows the relevant region. This axis automatically scales to the most appropriate size. The height of the graphs at each saturation is a representation of the relative number of image pixels with that saturation. The areas underneath the current and normal plots are the same, and are representative of the number of pixels in the image.

Before plotting, both data sets (normal data and current image data) may be analyzed to determine the maximum number of pixels of one saturation. Then the ratio between these may be calculated to determine the value to which the normal data should be normalized (between 0 and 1). For example, if the normal data has a maximum value that is larger than the current image data, then the normal data may be normalized to a value of 1. On the other hand, if the normal data is half the size of the current image data, then it may be normalized to 0.5. The normal data may remain normalized to that value until the ratio changes, with the current image data altering relative to the normal data.

The hue histogram may be calculated in the same manner, except that the horizontal axis (an angular measure of the hue) may be manually adjusted using a slider bar that is provided in the hue histogram window that may be displayed graphically. The hue axis does not automatically scale to the maximum value because this would normally be 360. The slider may allow a smaller region of interest (between 0 and 60 degrees) to be examined, even if there are some pixels distributed outside this region.

The particular saturation histogram shown in FIG. 30 demonstrates that there are a small numbers of pixels with both larger and smaller saturations than normal (see step 57 in FIGS. 1F and 1G). This is evident because the histogram shows that around 5% and 40% saturation, the green line is above the blue line. These deviations from normal result because the image contains regions of tissue that are both redder than normal and whiter than normal. The redder areas are then highlighted on the original image (see step 112 in FIG. 1E and step 112' in FIG. 1G).

The statistics window may contains statistical information about both the normal data and the current image data. The statistics calculated may be the maximum saturation and the mean, mode and standard deviation of both the hue and saturation. Maximum hue may be not calculated because it may be not a meaningful statistic. This is because the maximum hue will often be close to 360 due to the angular nature of the hue measurement (i.e., a hue of 1 degree is very similar to a hue of 359 degrees, so the maximum hue may lack meaning).

Adding all image pixel saturations, and dividing by the number of image pixels produces the mean saturation. The most common pixel saturation is the mode. The standard deviation is a measure of the spread of the pixel saturation's present in the image, and may be calculated using the formula:

$$\sigma = \sqrt{\frac{\sum (X - \mu)^2}{N}} \qquad (36)$$

where $(X-\mu)$ is the deviation from the mean and N is the number of image pixels. The program may be configured such that the current image statistics can be compared to the normal statistics by comparing the first and second columns in a statistics window that may be provided.

The manner in which any display of abnormal pixel information occurs, as well as the display of information confirming that subject tissue is normal, may vary with the user's preferences. One configuration for displaying such information, and for prompting the user for data relevant to the creation of such information, is set forth below.

10 Running a Program with a Frame-Grabber Installed 10.1 Setting Program Preferences Continuing with a discussion of the exemplary program that may be built to carry out steps of embodiments of the present methods, once the bronchoscope is correctly connected to the computer, an icon termed "Scope," for example, may be provided that can be "clicked on" in some fashion (e.g., by locating it on the desktop of the computer) to run the program.

Figure 31:
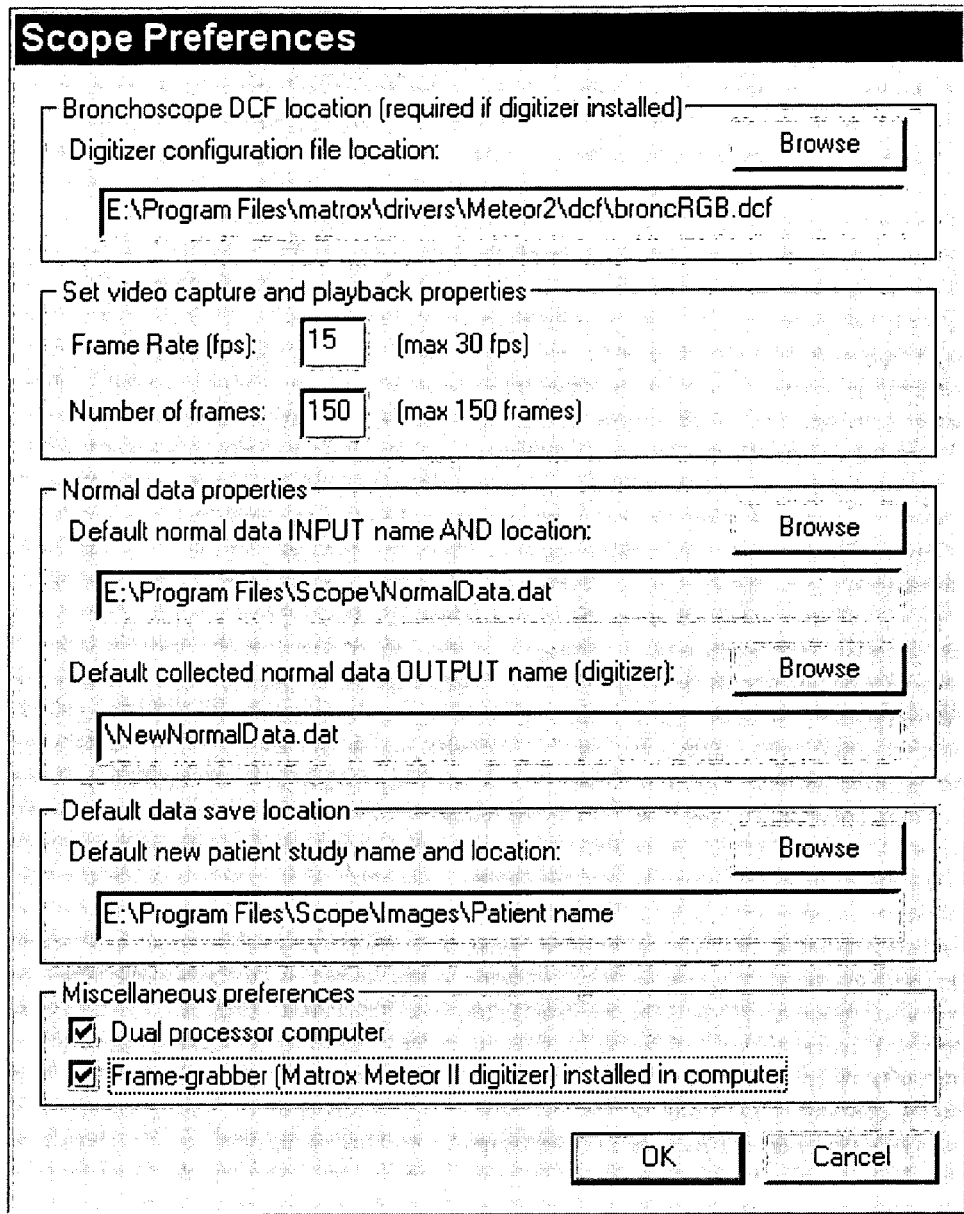
FIGS. 31-42 are examples of dialogs (also describable as dialog boxes) that may be displayed by a program configured to carry out one or more steps of embodiments of the present methods.

The first time the program is run, the program may be configured such that the dialog in FIG. 31 is displayed to the user. This dialog may be used to obtain the program preferences, and specify the locations of certain files. The first file location may be for the digitizer configuration file (which may be supplied with the program), which may specify how the frame-grabber will obtain images from the bronchoscope. The video capture and playback properties may be configured to specify the number of frames to grab during video sequence capture, as well as the rate at which to grab them. The normal data input name may refer to the name and location of the normal data file used in determining if pixels are abnormally colored. The default patient study name and location may specify the default location at which patient data (images and video) may be saved. The remaining two preferences shown may be used to determine if the computer contains two processors or one, and whether there is a frame-grabber (digitizer) installed in the computer.

If the program is being run for the first time on a particular computer (or the preferences file, which may be styled "c:/ScopePrefs.dat", has been deleted) then the "cancel" can be configured so as not to operate, because preferences may be selected before continuing. Once the preferences have been set the program may continue the initialization process.

10.2 Setting the Program Run Mode

Figure 32:
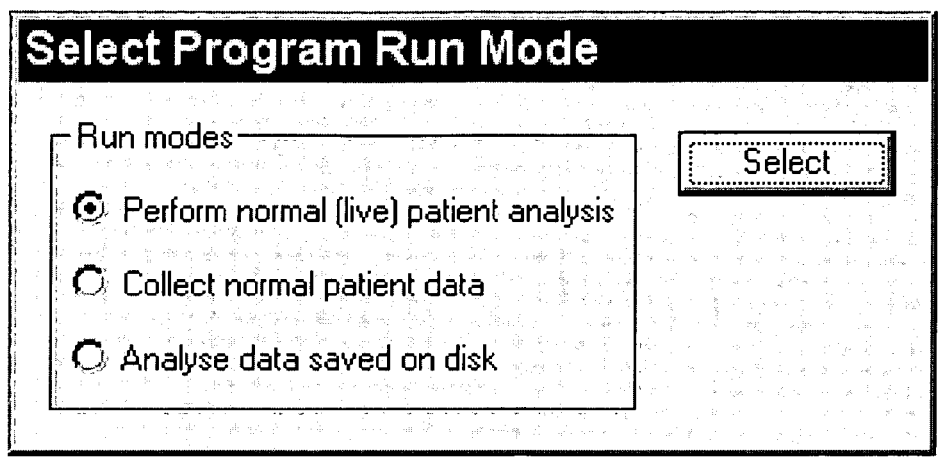

Once the preferences have been set, the program may be configured to request the user to select a run mode, as shown in FIG. 32. If a valid preferences file was located on the computer, then the preferences dialog of FIG. 31 may be not shown, and the dialog used to select the run mode (FIG. 32) may be the first dialog shown. As shown, the first option may be to perform normal patient analysis. Exemplary operation of this mode is described below, as are examples of the remaining modes shown in FIG. 32.

10.3 Obtaining the Patient Study Name

Figure 33:
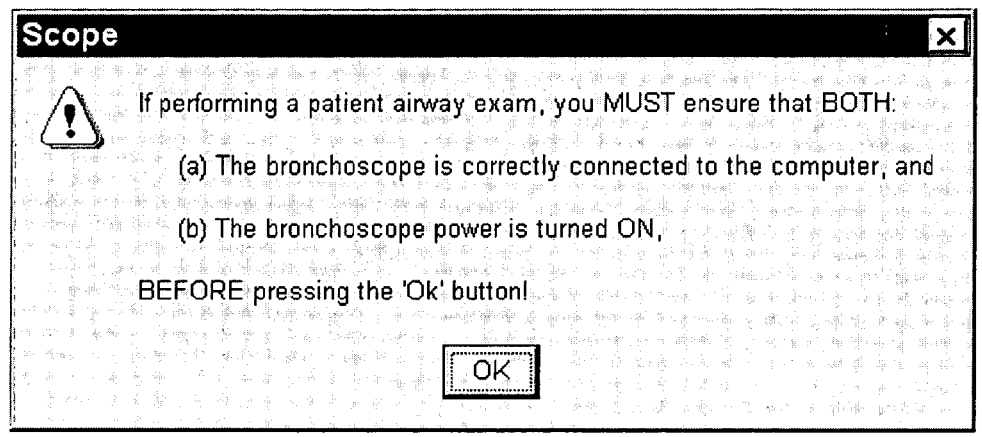

Once the program run mode has been set, the program may warn the user to ensure that the bronchoscope is correctly connected to the computer and the bronchoscope is turned on, before continuing. It is advisable to both connect the bronchoscope correctly and turn the bronchoscope on, so that when images are grabbed using the frame-grabber, the card is not damaged. If the card is grabbing images and the bronchoscope is then turned on, the frame-grabber may be damaged. Therefore, steps may be taken to ensure that all connections are correct and the bronchoscope is turned on before pressing "OK" (see FIG. 33). Once the OK button is pressed, the program may take a couple of seconds to perform some initialization.

Figure 34:
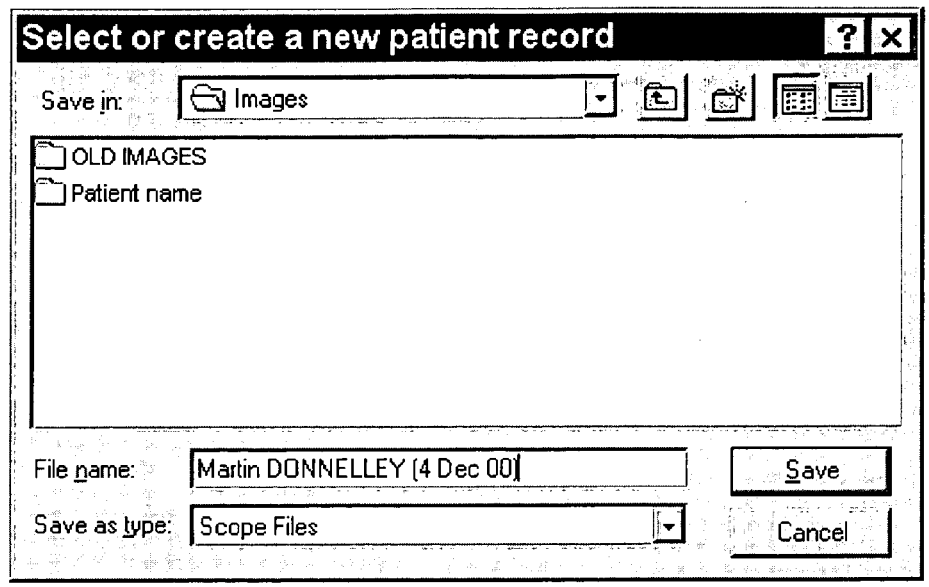
Figure 35:
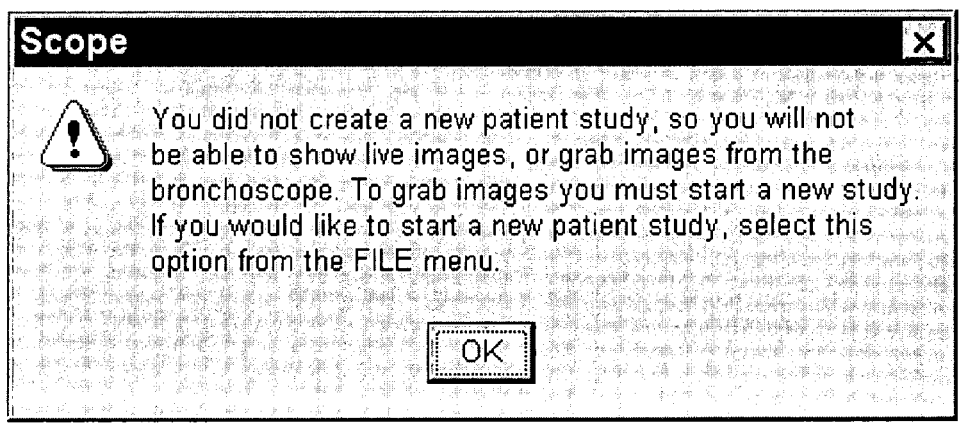

After this is completed, a patient study dialog may be shown, an example of which appears in FIG. 34. This dialog may be used to obtain the patient name, and the location at which all patient information may be stored. The default patient save name and location may be the same as the default patient data save location set in the scope preferences file. A user may press "Save" after entering the patient name and study date. The program may be configured such that if the "Cancel" button is pressed, a warning dialog may be shown, an example of which appears in FIG. 35. This dialog may convey that to grab images from the bronchoscope using the frame-grabber, a patient study name is to be entered. Without this information, it may be not possible to save images in the correct location. If "Cancel" is pressed, the program may be configured to default to running in the same mode as if "Analyze data saved on disk" had been selected as the run mode. If "Save" is selected, no warning may be given, and a new patient study directory may be created, into which images and video sequences can be saved. The patient name may then be shown in an information window until a new patient study is created.

10.4 An Exemplary Graphical User Interface for the Program

Figure 36:
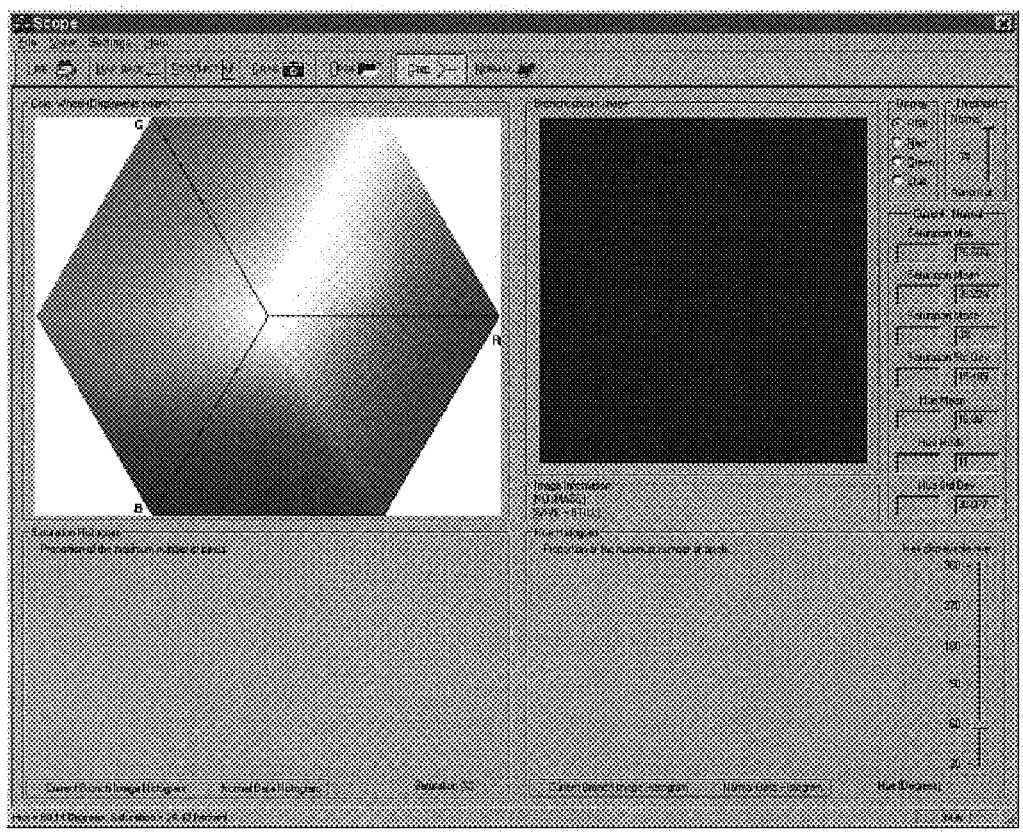
Figure 37:
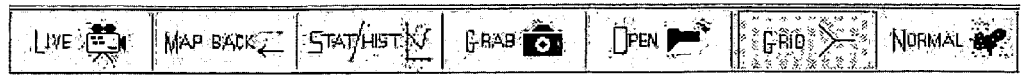

In either case ("Save" or "Cancel" pressed), the program may be configured such that a graphical user interface is then displayed, an example of which appears in FIG. 36. The user interface may comprise multiple (e.g., separate) regions. These may be the color wheel, the bronchoscopic image window, the hue and saturation histograms and the statistics. As shown in FIG. 36, a tool bar may be located above the color wheel window, the tool bar containing multiple (e.g., seven) buttons that may be used to control the program. FIG. 37 depicts an example of such a tool bar. The functions of those buttons are explained below.

10.5 The "Live" Button (or 'Ctrl+L')

The "Live" button is the first button located on the exemplary toolbar shown in FIG. 37, and may be used to control the live acquisition and display of images from the bronchoscope. The program may be configured such that pressing this button once starts the display of live images in the bronchoscopic image window at a frame rate of, for example, 30 fps (frames per second). The frame rate may be shown in an information window. During live image display, the frame rate may be approximately 30 fps. The actual bronchoscopic image may be the only part of the bronchoscope screen that is displayed in an image window (see FIG. 36). The information (including patient details) surrounding the image may be not saved by the program in any location. The image shown in the image window may therefore be exactly the same as the image viewed on the bronchoscope, except that it may be sized to fit in the image window.

The program may be configured such that pressing the "Live" button again halts the live image display, with the last image grabbed remaining on the screen. Even when the program is performing other functions such as mapping color abnormality or displaying histograms, the program may be configured such that the "Live" button still controls live image display. The program also may be configured such that pressing it while abnormality is being mapped onto the bronchoscopic images halts image acquisition and mapping.

10.6 The "Map Back" Button (or 'Alt+M')

The "Map Back" button (the function behind which is discussed above) may be the second button located on the toolbar, and may be used to control whether the color of the images is mapped back to the color wheel (as described above), and whether the abnormally colored areas are highlighted on the original subject color medical image. If this button is pressed, each image grabbed from the bronchoscope may be analyzed in this manner, resulting in a slower frame rate. When there is little abnormally colored tissue present, a frame rate of about 10 fps may result. The program may be configured such that pressing the "Map Back" button when the abnormal colors are being mapped turns off this feature, with the program just showing live images in the bronchoscope window. When the "Open" button is pressed and a video sequence is opened, the program may be configured such that the "Map Back" button has a slightly different operation, which is explained in the "Open" button section below.

The program may be configured such that the "Map Back" button does not affect the status of live image display. If live images are being displayed when "Map Back" is pressed, then the images may be analyzed as they are grabbed. If live images are not being displayed, then pressing "Map Back" may not result in live image analysis until "Live" is pressed.

10.7 The "Stat/Hist" Button (or 'Alt+H')

The "Stat/Hist" button is the third button located on the toolbar shown in FIG. 37, and its function may be to control the plotting of the hue and saturation histograms, and the calculation of the statistics. The "Stat/Hist" and "Map Back" buttons may operate together, in that pressing "Stat/Hist" when "Map Back" is not selected may result in both being checked. Similarly, the program may be configured such that pressing "Map Back" when both are checked may result in both being unchecked. Pressing "Stat/Hist" when both are selected may only result in "Stat/Hist" being unchecked. The program may be configured to operate in this way because images may be analyzed to draw the histograms and calculate the statistics, so pressing "Stat/Hist" may start both mapping of abnormally colored tissue and drawing of the histograms.

When the "Stat/Hist" button is pressed, the program may analyze the current image to map pixels onto the color wheel, highlight abnormal pixels on the image, plot the saturation and hue histograms, and calculate the current image statistics.

The "Stat/Hist" button may not affect the status of live image display. If live images are being displayed when "Stat/Hist" is pressed, the program may be configured such that then the images will be analyzed as they are grabbed. If live images are not being displayed, then pressing "Stat/Hist" may not result in live histogram and statistics calculation until "Live" is pressed.

10.8 The "Grab" Button (or 'space-bar')

Figure 38:
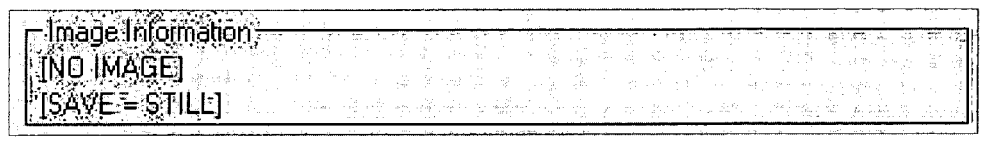
Figure 39:
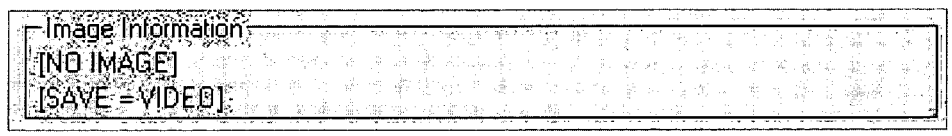

The "Grab" button is the fourth button located on the exemplary toolbar shown in FIG. 37, and may be used to save either a single image (e.g., in tagged image file format—tiff) or a sequence of images (e.g., as a sequence file—avi) into the patient study directory on the hard drive. To alter whether the program grabs single images or video sequences, the key combination 'Alt+V' may be pressed or the program may be configured to provide a "Save still images rather than &video sequences when "Grab" is pressed" item in the view menu that can be selected. The information window may show what type of data is to be saved. If still images are to be saved when "Grab" is pressed (which may be the default), then the information window may look like the one shown in FIG. 38. If a video sequence is to be saved when the "Grab" button is pressed, then the information window may look like the one shown in FIG. 39.

The frame rate and number of frames the program grabs to create the sequence may be determined by the values set in the preferences file. The default values may be 15 frames per second and 150 frames. Therefore 10 seconds of video may be saved by default during each grab. After the "Grab" button is pressed, the program may be configured such that the current frame is saved to disk and then analyzed as if both "Map Back" and "Stat/Hist" are selected. Therefore, the state of these two buttons may not affect whether the image is analyzed after it is saved. It may be analyzed automatically. The "Grab" function also may not require the "Live" button to be pressed (i.e., live images to currently be displayed) for the "Grab" button to operate correctly.

If the save type is set to still, the program may be configured such that then each time "Grab" is pressed a single image is obtained from the bronchoscope, saved and then analyzed, with the analyzed image and histograms remaining on the screen.

If the save type is set to video, the program may be configured such that then each time "Grab" is pressed, a sequence of images is grabbed, with the live images shown during the acquisition process. After the sequence is saved, the last image may be analyzed and remain on the screen, along with the histograms.

The individual frames of a video sequence grabbed from the bronchoscope may be not analyzed even if "Map Back" is selected. This may be because image analysis may not be performed at a sufficiently high rate to match the acquisition rate. Therefore, video sequences may be not analyzed while being grabbed. The program may be configured such that an image or video sequence can also be grabbed by pressing the space-bar rather than the "Grab" button. Both may perform the same function.

10.9 The "Open" Button (or 'Ctrl+S')

Figure 40:
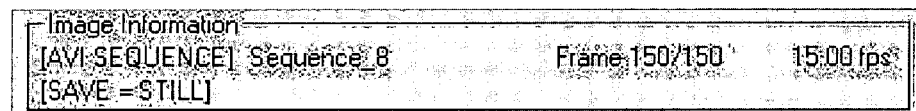

The "Open" button is the fifth button located on the exemplary toolbar shown in FIG. 37. It may be used to load still images or video sequences that have been saved on disk using the "Grab" button. When the "Open" button is pressed, the program may be configured such that an open dialog is shown allowing the user to select the file they would like to open. Supported file formats may include tiff, jpeg, bmp, gif and avi (video sequence format). While an open box is displayed, image analysis and/or mapping may continue in the background, if it was being performed when the "Open" button was pressed. The program may also be configured such that if "Cancel" is pressed then the dialog is closed and the program continues to operate as it did before the "Open" button was pressed. If an image is selected and "Open" is pressed, then the program may halt any live image display and/or analysis before continuing. At this point, slightly different operations may be performed, depending on whether a still image or video sequence was selected. In either case, the information window may include information—such as the file name and type—about the image being opened (and analyzed). An example of such a dialog is shown in FIG. 40.

For a still image, the program may load the image, display it in the bronchoscopic image window, performs the color wheel and image mapping, draws the histograms and calculates the statistics. In addition, the program may also save the analyzed image (e.g., with all abnormally colored areas of tissue highlighted in green) in the same directory as the original image (e.g., the same directory as just selected in the open dialog), when the "Map Back" button is checked. The save name may be the same as the original name, except that the prefix "Analyzed-" may be added. The image may be saved by default in tiff format, regardless of the input format. If "Map Back" is not selected, then the image may be analyzed and not saved.

When a video sequence is selected, the operation of the program may depend on whether the "Map Back" button is checked or not. If "Map Back" is not selected then the program may load the sequence and play the number of frames specified in the preferences file at the specified frame rate. No analysis may be performed. The frame rate display in the information window may show the rate at which video is being played. The current frame and total number of frames also may be shown.

If "Map Back" is selected, then each frame may be analyzed, with pixel mapping, abnormal color highlighting, histogram calculation and statistics calculation performed. After all frames (the number analyzed also may be determined by the preferences file) have been analyzed, the sequence (containing some or all abnormal pixels highlighted) may be saved in the same directory as the original with the prefix "Analyzed-" added. During analysis the frame rate shown may represent the rate at which the saved video will play (if opened in a video player such as Windows Media Player). The information window may also display the frame currently being analyzed and the total number of frames. When analysis is complete, the final frame may remain on the screen along with the corresponding pixel mappings, histograms and statistics.

The video sequence may be played back at the frame rate specified in the preferences file, and not the frame rate at which it was recorded. Similarly, the number of frames played may be determined by the preferences, and not by the number of frames actually recorded. Therefore, the video may be not reproduced accurately if these settings are changed between recording and playing of a sequence.

Once the still image or video sequence has been displayed and/or analyzed the program may wait for further user input. At this point, the "Live" button may be pressed again to show live bronchoscopic images and further live analysis may be performed. Alternatively, the "Open" button may be pressed again to display and/or analyze other images or video sequences.

10.10 The "Grid" Button (or 'Alt+D')

The "Grid" button is the sixth button located on the exemplary toolbar shown in FIG. 37, and its function may be simply to turn the color wheel grid on and off.

10.11 The "Normal" Button (or 'Alt+N')

The "Normal" button is the last button located on the exemplary toolbar shown in FIG. 37. The function of this button may be to alter how the normal pixels are plotted on the color wheel. This function may be normally turned off, which may cause only the normal pixels in the image to be plotted on the color wheel along with all abnormal pixels (in, e.g., black). Therefore, all gray pixels plotted on the color wheel may represent normal pixels that are actually present in the current image. When this button is pressed, it may cause all normal pixels to be plotted on the color wheel, regardless of whether or not they are present in the image, along with all abnormal pixels (in, e.g., black). This function can therefore be used to show the locations on the color wheel that are regarded as normal, by highlighting them all the time.

When "Normal" is selected, note that, in some embodiments, the gray pixels on the color wheel do not represent all the colors present in the current image. They may represent all possible normal colors that could appear in the image.

11. Other Program User Controls that May be Provided

11.1 The "Create New Patient Study" Menu Option (or 'Ctrl+N')

The program may be configured such that selecting this menu option from the file menu creates a dialog box identical to that shown when the program was started. After a new study name and location is entered, the program may reload the original settings (and save any normal data collected, if in the collect normal data mode), and restore the program to its original state. It may then operates exactly as before except that images and video sequences are saved in the newly created patient study directory.

11.2 The "Display" Control

Figure 41:
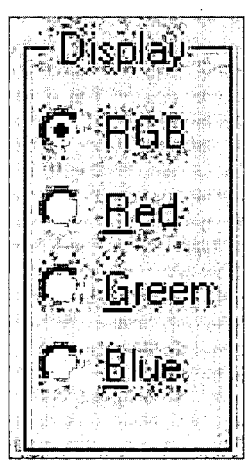

A "Display" control dialog may be located in the top right corner of the program's interface window, and may contains the buttons shown in FIG. 41. Such buttons may be used to alter how bronchoscopic images are displayed and saved. The program may be configured such that only one button can be selected at a time, with the default being RGB. Leaving RGB selected may result in a three-band (full color) image being displayed on the screen, and three band images being saved when the "Grab" button is pressed. The program may also be configured such that if any of the other three buttons are selected, then only that particular image band is displayed or saved to disk during a grab (or saved after the three band image is analyzed using the "Open" button). As described above, a color can be described by the proportions of red, green and blue it contains. Therefore, adding together the individual red, green and blue images will produce the RGB (full color) image.

When single band images are saved using the "Grab" button, only that particular band being displayed may be saved to disk. This means that one third of the image information (the two undisplayed bands) may be discarded upon saving. It may, therefore, be preferable not to analyze these single band images at a later date using the "Open" button. If the program is used to analyze single band images, the results may be unreliable because a large proportion of the data that may be used to calculate the hue and saturation of each color image pixel would be missing. Therefore, save single band images when they will not need to be analyzed later. If later analysis is contemplated, then save three band RGB images (e.g., the default setting) and analyze the image later, saving only a single band.

11.3 The "Threshold" Control

Figure 42:
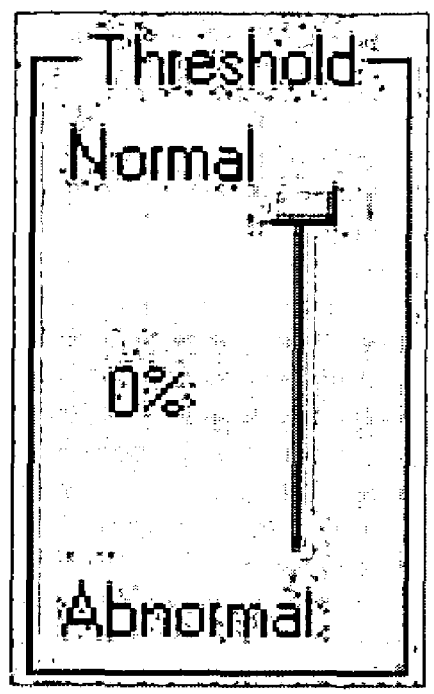

The program may be configured such that a "Threshold" control may exist as a small slider bar located next to the "Display" control in the top right corner of the user interface window. An exemplary "Threshold" control dialog is depicted in FIG. 42. This slider may be used to select the threshold value the program uses to determine whether a particular color wheel location is normal or abnormal.

To understand how this control may be configured to work in one embodiment, consider how data may be stored within the "NormalData.dat" file. This file may contain a matrix of integers each representing a particular location on the color wheel. The value of the integer at each matrix location may be the number of pixels of that hue and saturation (e.g., that location on the color wheel) that were detected in the images used to create the normal data file. It is therefore a measure of how often a pixel of that color occurs in an image. Matrix locations with a value of zero indicate a color with a hue and saturation that does not occur in normal patients. The larger the value, the more common the color with that hue and saturation.

This control may therefore allow the user to select the threshold that the program uses to distinguish normal tissue from abnormal. The default value may be zero (at the normal end), indicating that all colors ever detected in normal volunteers may be mapped as normal. Moving the slider to the abnormal end of the scale may increase the threshold. This means that more pixels may be required to be located at a particular hue and saturation in the normal data file for bronchoscopic image pixels of that color to be mapped as normal. As the slider is moved down, more areas of tissue on the image will be highlighted green, indicating that those areas that are not highlighted are the most normal.

In addition to altering the highlighting on the image, moving the slider may also updates the color wheel mapping to indicate which regions are normal or abnormal. This means that moving the slider towards abnormal may result in more black (abnormal) than gray (normal) areas on the color wheel. The slider may be used while analyzing images in real time, or when analyzing a still image. For still images, the areas highlighted on the current image and the color wheel mappings may be updated as the slider is moved.

The slider may have no effect when collecting normal data, considering there may be no normal data to use for the thresholding process.

The present methods and devices are not intended to be limited to the particular forms disclosed. Rather, they are to cover all modifications, equivalents, and alternatives falling within the scope of the claims. For example, although the HSI color space was specified for use with the exemplary program discussed above due in part to the similarity between that color space and the perception of color in human vision, the fundamental principles of the present methods remain constant regardless of the color encoding approach used. Such color coordinate systems may include, but are not limited to, the RcGcBc spectral primary color coordinate system developed in 1931 by the CIE as a primary reference system, the YIQ transmission color coordinate system used for transmission for color television in the United States, the CIE developed XYZ color coordinate system, and the L*u*v* color coordinate system which became the CIE standard in 1976.

The appended claims are not to be interpreted as including means-plus-function limitations, unless such a limitation is explicitly recited in a given claim using the phrase(s) "means for" and/or "step for," respectively.

REFERENCES

These references are specifically incorporated by reference in their entirety.

U.S. Pat. No. 6,519,355
U.S. Pat. No. 6,516,277
U.S. Pat. No. 6,508,768
U.S. Pat. No. 6,507,632
U.S. Pat. No. 6,504,895
U.S. Pat. No. 6,501,849
U.S. Pat. No. 6,415,048
U.S. Pat. No. 6,081,612
U.S. Pat. No. 5,836,877
U.S. Pat. No. 5,827,190
U.S. Pat. No. 5,712,966
U.S. Pat. No. 5,398,684
U.S. Pat. No. 5,374,965
U.S. Pat. No. 5,345,315

Chang, and Reid, "RGB Calibration for Color Image Analysis in Machine Vision", IEEE Trans. on Image Processing, 5(10):1414-1422, 1996.

Giorgianni, and Madden, "Digital Color Management Encoding Solutions", Addison Wesley Longman Inc., Massachusetts, 1998.

Guyton & Hall, "Text Book of Medical Physiology", 9$^{th}$ ed. Saunders, 1984.

Haeghen, Naeyaert, Lemahieu, Philips, "An imaging system with calibrated color acquisition for the use in dermatology", IEEE Trans. Medical Imaging, 19(7):722-730, 2000.

Herbin, Bon, Venot, Jeanlouis, Dubertret, Dubertret, and Strauch, "Assessment of healing kinetics though true color image processing", IEEE Trans. Medical Imaging, 12(1): 39-43, 1993.

Herbin, Venot, Devaux, Piette, "Color Quantitation Through Image Processing in Dermatology", IEEE Trans. on Medical Imaging, 9(3):262-269, 1990.

Jackson, "Bronchoscopy: past, present and future," N. Engl. J. Med, 199-758, 1928.

Kang, "Color Technology for Electronic Imaging Device", SPIE Opt. Eng. Press, New York, 1997.

Knyrim, Seidlitz, Hagenmuller, Classen, "Color performance of video endoscope: Quantitative measurement of color reproduction", Endoscopy 19:233-236, 1987.

Levitzky, "Pulmonary Physiology", McGraw Hill, 1982.

Nischik and Forster, "Analysis of skin erythema using true-color images", IEEE Trans. Medical Imaging, 16(6):711-716, 1997.

Picciano and Taylor, "Color technology in video endoscopy", Journal of Clinical Engineering, 19(6):490-496, 1994.

Pratt, "Digital Image Processing", John Wiley, New York, 1978.

Stradling, "Diagnostic Bronchoscopy", 4$^{th}$ ed. Churchill Livigstone, 1981.

West, "Respiratory Physiology—the essentials", 5$^{th}$ ed. Williams & Wilkins, Baltimore, Md., 1995.

We claim:

1. A method comprising:
comparing a subject color medical image acquired using an endoscope to normal color medical image data;
identifying abnormal pixels from the subject color medical image; and
graphically displaying the subject color medical image and highlighting areas of the subject color medical image that have a saturation that is greater than normal.

2. A method comprising:
graphically displaying a subject color medical image acquired using an endoscope;
comparing the subject color medical image to normal color medical image data to identify abnormal pixels from the subject color medical image; and
highlighting abnormal pixels on the displayed subject color medical image;
where the highlighting includes highlighting areas of the displayed subject color medical image that have a saturation that is greater than normal.

3. A method comprising:
acquiring a subject color medical image using an endoscope;
displaying a region of interest from the subject color medical image;
comparing the region of interest to normal color medical image data to identify abnormal pixels from the region of interest; and
highlighting abnormal pixels on the displayed region of interest;
where the highlighting includes highlighting areas of the displayed region of interest that have a saturation that is greater than normal.

4. A method comprising:
comparing a subject color medical image to normal color medical image data;
identifying abnormal pixels from the subject color medical image; and
displaying the subject color medical image and highlighting areas of the subject color medical image that have a saturation that is greater than normal;
where the comparing, the identifying, the displaying, and the highlighting are performed using a computer system programmed for the comparing, the identifying, the displaying, and the highlighting.

5. A method comprising:
displaying a subject color medical image;
comparing the subject color medical image to normal color medical image data to identify abnormal pixels from the subject color medical image; and
highlighting abnormal pixels on the displayed subject color medical image;
where the highlighting includes highlighting areas of the displayed subject color medical image that have a saturation that is greater than normal; and
where the displaying, the comparing, and the highlighting are performed using a computer system programmed for the displaying, the comparing, and the highlighting.

* * * * *

UNITED STATES PATENT AND TRADEMARK OFFICE
CERTIFICATE OF CORRECTION

PATENT NO. : 7,613,335 B2 Page 1 of 1
APPLICATION NO. : 10/777764
DATED : November 3, 2009
INVENTOR(S) : McLennan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1444 days.

Signed and Sealed this

Fourteenth Day of December, 2010

David J. Kappos
*Director of the United States Patent and Trademark Office*